(12) United States Patent
Everson et al.

(10) Patent No.: US 12,553,432 B1
(45) Date of Patent: Feb. 17, 2026

(54) DYNAMIC FLUX WEAKENING FOR A SINGLE PHASE LINEAR COMPRESSOR

(71) Applicant: Haier US Appliance Solutions, Inc., Wilmington, DE (US)

(72) Inventors: Thomas Raymond Everson, Louisville, KY (US); Joseph Wilson Latham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/075,960

(22) Filed: Mar. 11, 2025

(51) Int. Cl.
*F04B 49/06* (2006.01)
*F04B 35/04* (2006.01)

(52) U.S. Cl.
CPC .............. *F04B 49/06* (2013.01); *F04B 35/04* (2013.01); *F04B 2203/0401* (2013.01); *F04B 2203/0402* (2013.01)

(58) Field of Classification Search
CPC .. F04B 49/06; F04B 35/04; F04B 2203/0401; F04B 2203/0402; F04B 35/045;
(Continued)

(56) References Cited

U.S. PATENT DOCUMENTS 6,753,665 B2 6/2004 Ueda et al.
6,793,167 B2 9/2004 Karkos, Jr. et al.
(Continued)

FOREIGN PATENT DOCUMENTS

CN 1754306 A * 3/2006 ............. F04B 49/02
CN 103812390 A 5/2014
(Continued)

OTHER PUBLICATIONS

G. Xingye et al., "Analysis and dynamic decoupling control schemes for PMSM current Loop", IEEE International Conference on Aircraft Utility Systems, Oct. 2016, Beijing, China, pp. 570-574.
(Continued)

*Primary Examiner* — Dominick L Plakkoottam
(74) *Attorney, Agent, or Firm* — Dority & Manning, P.A.

(57) ABSTRACT

A method for controlling a linear compressor of an appliance includes receiving, via a controller of the linear compressor, a d-axis current error signal, a q-axis current error signal, and a DC current error signal. The method also includes determining, via the controller, a DC voltage component signal based on the DC current error signal. The DC voltage component signal is limited by a first voltage threshold. Further, the method includes then determining, via the controller, a d-axis voltage component signal based, at least in part, on the q-axis current error signal. The d-axis voltage component signal is limited by a second voltage threshold. Furthermore, the method includes then determining, via the controller, a q-axis voltage component signal based, at least in part, on the d-axis current error signal. The q-axis voltage component signal is limited by a third voltage threshold that is less than the second voltage threshold. In addition, the method includes controlling, via the controller, a motor of the linear compressor using a single-phase vector-like control scheme based, at least in part, on the DC voltage component signal, the d-axis voltage component signal and the q-axis voltage component signal.

20 Claims, 14 Drawing Sheets

(58) Field of Classification Search
CPC .................... F04B 49/065; F25B 31/023; F25B 2600/024; F25B 2700/151; F25B 1/02; F25B 49/025
See application file for complete search history.

(56) References Cited

U.S. PATENT DOCUMENTS

| | | | |
|---|---|---|---|
| 6,864,647 | B2 | 3/2005 | Duncan et al. |
| 6,949,900 | B1 | 9/2005 | Berringer |
| 7,025,571 | B2 | 4/2006 | Jeun |
| 7,045,988 | B2 | 5/2006 | Ha et al. |
| 7,301,298 | B2 | 11/2007 | Shao et al. |
| 7,550,941 | B2 | 6/2009 | Dainez et al. |
| 8,100,668 | B2 | 1/2012 | Yoo et al. |
| 8,339,081 | B2 | 12/2012 | Patel et al. |
| 8,704,469 | B2 * | 4/2014 | Tadano ............... H02P 21/05 318/431 |
| 9,143,066 | B2 * | 9/2015 | Yang ..................... H02P 6/18 |
| 9,397,596 | B2 | 7/2016 | Baker |
| 9,399,991 | B2 | 7/2016 | Dainez et al. |
| 9,518,578 | B2 * | 12/2016 | Dainez ................ H02K 33/16 |
| 9,780,718 | B2 | 10/2017 | Barfus et al. |
| 9,850,890 | B2 | 12/2017 | Lim et al. |
| 10,111,558 | B2 | 10/2018 | Dickson, Jr. et al. |
| 10,174,753 | B2 | 1/2019 | Kusumba et al. |
| 10,273,948 | B1 * | 4/2019 | Goodjohn ............ F04B 35/04 |
| 10,622,870 | B2 | 4/2020 | Campbell et al. |
| 11,374,519 | B2 | 6/2022 | Yajurvedi et al. |
| 11,406,224 | B2 | 8/2022 | Cunningham |
| 11,434,883 | B2 | 9/2022 | Latham et al. |
| 11,444,558 | B1 | 9/2022 | Latham et al. |
| 11,563,347 | B2 | 1/2023 | Pennington et al. |
| 11,699,969 | B2 * | 7/2023 | Ji ....................... F25B 31/026 318/400.02 |
| 2004/0195995 | A1 * | 10/2004 | Quirion ............ H02M 7/53875 318/811 |
| 2004/0245949 | A1 * | 12/2004 | Ueda ..................... H02P 6/15 318/400.14 |
| 2005/0023905 | A1 * | 2/2005 | Sakamoto ............ H02K 33/16 310/12.17 |
| 2008/0001571 | A1 | 1/2008 | Tomigashi |
| 2010/0148710 | A1 | 6/2010 | Lim et al. |
| 2013/0192294 | A1 * | 8/2013 | Yoo ......................... F25B 1/02 417/2 |
| 2013/0193886 | A1 | 8/2013 | Yoon et al. |
| 2013/0195677 | A1 * | 8/2013 | Yoo ......................... F25B 5/02 417/45 |
| 2013/0287602 | A1 | 10/2013 | Suzuki et al. |
| 2016/0215770 | A1 * | 7/2016 | Kusumba ............ F04B 35/045 |
| 2016/0218654 | A1 * | 7/2016 | Wu ........................ H02P 6/18 |
| 2016/0254771 | A1 | 9/2016 | Qiao et al. |
| 2017/0126160 | A1 * | 5/2017 | Ademoye ............ H02P 21/18 |
| 2017/0207733 | A1 * | 7/2017 | Matsuyama ........ F04B 39/0207 |
| 2018/0051690 | A1 * | 2/2018 | Stair .................... F04B 25/02 |
| 2019/0186480 | A1 | 6/2019 | Kulkarni et al. |
| 2020/0362842 | A1 | 11/2020 | Hahn et al. |
| 2021/0050807 | A1 | 2/2021 | Xu et al. |
| 2021/0259472 | A1 | 8/2021 | Seidler et al. |
| 2021/0354566 | A1 * | 11/2021 | Ben-Ari ................ B60T 1/10 |
| 2022/0006403 | A1 | 1/2022 | Sasaki et al. |
| 2022/0120292 | A1 | 4/2022 | Brewer et al. |
| 2022/0376639 | A1 | 11/2022 | Latham et al. |
| 2024/0271613 | A1 * | 8/2024 | Latham ............... F04B 49/065 |

FOREIGN PATENT DOCUMENTS

| | | | | |
|---|---|---|---|---|
| CN | 104764287 | A | * | 7/2015 ............ F25D 21/08 |
| CN | 104333273 | B | | 2/2017 |
| CN | 108347207 | A | | 7/2018 |
| CN | 106357183 | B | | 9/2018 |
| CN | 106655940 | B | | 5/2019 |
| CN | 110323984 | A | | 10/2019 |
| CN | 111425383 | A | | 7/2020 |
| CN | 111464084 | A | | 7/2020 |
| CN | 109617483 | B | | 10/2020 |
| CN | 110518852 | B | | 10/2021 |
| CN | 113676106 | A | | 11/2021 |
| CN | 112187126 | B | | 4/2023 |
| CN | 116232163 | A | | 6/2023 |
| EP | 1446579 | B1 | | 10/2005 |
| EP | 3098449 | A1 | | 11/2016 |
| EP | 3883121 | A1 | | 9/2021 |
| JP | 2006304452 | A | | 11/2006 |
| JP | 2018127956 | A | * | 8/2018 |
| KR | 100588719 | B1 | | 3/2006 |
| WO | WO-2004073156 | A1 | * | 8/2004 ............ H02P 6/10 |
| WO | WO2013188940 | A2 | | 12/2013 |
| WO | WO-2019008909 | A1 | * | 1/2019 ............ H02P 25/064 |

OTHER PUBLICATIONS

M. J. Corley et al., "Rotor position and velocity estimation for a salient-pole permanent magnet synchronous machine at standstill and high speeds," in IEEE Transactions on Industry Applications, Jul.-Aug. 1998, vol. 34, No. 4, pp. 784-789.

S. D. Sudhoff et al., "A flux-weakening strategy for current-regulated surface-mounted permanent-magnet machine drives," in IEEE Transactions on Energy Conversion, Sep. 1995, vol. 10, No. 3, pp. 431-437.

Y. Zhang et al., "Adaptive PI parameter of flux-weakening controller based on voltage feedback for model predictive control of SPMSM", 2020 IEEE Energy Conversion Congress and Exposition, Oct. 2020, pp. 2674-2681. (Abstract Only).

\* cited by examiner

DYNAMIC FLUX WEAKENING FOR A SINGLE PHASE LINEAR COMPRESSOR

FIELD

Example aspects of the present disclosure relate to linear compressors, such as linear compressors for refrigerators and other appliances.

BACKGROUND

Generally, refrigerator appliances include a cabinet that defines one or more chilled chambers, such as a fresh food chamber for receipt of food items for storage and/or a freezer chamber for receipt of food items for freezing and storage. Certain refrigerator appliances may also include sealed systems for cooling such chilled chambers thereof. The sealed systems generally include a linear compressor that generates compressed refrigerant during operation thereof. The compressed refrigerant flows to an evaporator where heat exchanges between the chilled chambers and the refrigerant cools the chilled chambers and food items located therein.

Linear compressors generally include a piston within a housing and a driving coil that generates a force for moving the piston forward and backward within the housing. During motion of the piston within the housing, the piston compresses the refrigerant. Furthermore, linear compressors are generally operated a single-phase motor driven by a single-phase variable-frequency drive. The variable-frequency drive is a type of motor drive that is used to control the motor speed and force by varying motor voltage input frequency and amplitude.

SUMMARY

Aspects and advantages of embodiments of the present disclosure will be set forth in part in the following description, or can be learned from the description, or can be learned through practice of the embodiments.

In one exemplary aspect of the present disclosure, a method for controlling a linear compressor of an appliance is provided. The method includes receiving, via a controller of the linear compressor, a d-axis current error signal, a q-axis current error signal, and a DC current error signal. The method also includes determining, via the controller, a DC voltage component signal based on the DC current error signal. The DC voltage component signal is limited by a first voltage threshold. Further, the method includes then determining, via the controller, a d-axis voltage component signal based, at least in part, on the q-axis current error signal. The d-axis voltage component signal is limited by a second voltage threshold that is different than the first voltage threshold. Furthermore, the method includes then determining, via the controller, a q-axis voltage component signal based, at least in part, on the d-axis current error signal. The q-axis voltage component signal is limited by a third voltage threshold that is less than the second voltage threshold. In addition, the method includes controlling, via the controller, a motor of the linear compressor using a single-phase vector-like control scheme based, at least in part, on the DC voltage component signal, the d-axis voltage component signal and the q-axis voltage component signal.

In one exemplary aspect of the present disclosure, a linear compressor defining an axial direction and a vertical direction is provided. The linear compressor includes a cylindrical casing defining a compressor chamber. The linear compressor also includes a piston positioned within the compressor chamber and being movable along the axial direction. Further, the linear compressor includes a motor operably coupled to the piston. In addition, the linear compressor includes a controller configured to control the motor. The controller is configured to perform operations for controlling the motor. The operations include receiving a d-axis current error signal, a q-axis current error signal, and a DC current error signal. The operations also include determining a DC voltage component signal based on the DC current error signal. The DC voltage component signal is limited by a first voltage threshold. Further, the operations include then determining a d-axis voltage component signal based, at least in part, on the q-axis current error signal. The d-axis voltage component signal is limited by a second voltage threshold that is different than the first voltage threshold. Furthermore, the operations include then determining a q-axis voltage component signal based, at least in part, on the d-axis current error signal. The q-axis voltage component signal is limited by a third voltage threshold that is less than the second voltage threshold. In addition, the operations include controlling a motor of the linear compressor using a single-phase vector-like control scheme based, at least in part, on the DC voltage component signal, the d-axis voltage component signal and the q-axis voltage component signal.

In one exemplary aspect of the present disclosure, an appliance is provided. The appliance includes a cabinet defining an internal chamber and a door mounted to the cabinet to provide selective access to the internal chamber. The appliance also includes a linear compressor. The linear compressor has a piston movable in a negative axial direction toward a compressor chamber and a positive axial direction away from the compressor chamber. Further, the appliance includes a motor operably coupled to the piston. Furthermore, the appliance includes an inverter configured to supply a variable frequency waveform to the motor. In addition, the appliance includes a controller configured to control the motor. The controller is configured to perform operations for controlling the motor. The operations include receiving a d-axis current error signal, a q-axis current error signal, and a DC current error signal. The operations also include determining a DC voltage component signal based on the DC current error signal. The DC voltage component signal is limited by a first voltage threshold. Further, the operations include then determining a d-axis voltage component signal based, at least in part, on the q-axis current error signal. The d-axis voltage component signal is limited by a second voltage threshold that is different than the first voltage threshold. Furthermore, the operations include then determining a q-axis voltage component signal based, at least in part, on the d-axis current error signal. The q-axis voltage component signal is limited by a third voltage threshold that is less than the second voltage threshold. In addition, the operations include controlling a motor of the linear compressor using a single-phase vector-like control scheme based, at least in part, on the DC voltage component signal, the d-axis voltage component signal and the q-axis voltage component signal.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
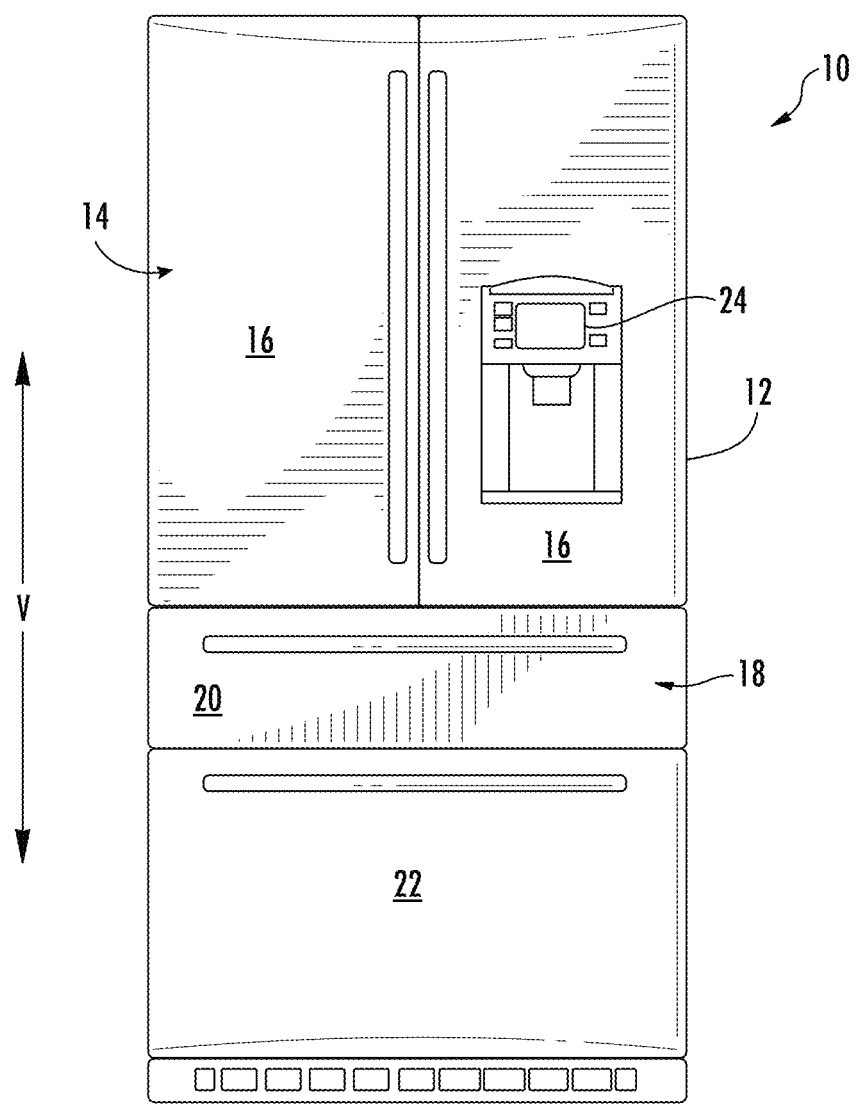
FIG. 1 depicts a front elevation view of a refrigerator appliance according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure relate generally to linear compressors such as, e.g., linear compressors for refrigerators and other appliances.

At steady-state, the linear compressor can be configured to drive a motor so as to achieve the most stroke for the least amount of current. However, the stroke at which the motor can be driven is limited by the voltage that can be applied by the inverter and the voltage required by the motor which is primarily determined by back electromotive force (back-EMF) of the motor. More particularly, to drive the motor, the inverter must overcome the back-EMF of the motor, and the back-EMF of the motor is proportional to the stroke of the motor. Hence, at a certain stroke, the inverter will not be able to provide increased voltage and will not be able to stroke the motor any further.

As such, in order to optimally drive the linear compressor, a phase between motor current and back-EMF of the motor must be manipulated. This same principle can apply to three-phase motors (e.g., brushless direct current (BLDC) motors, permanent magnet synchronous motors (PMSM)). In the case of three-phase motors, the phase between motor current and back-EMF can be controlled by a controller implementing a field-oriented control (FOC) control scheme. FOC control schemes define two components of a target current of the motor—a direct current (i.e., d-axis current) component and a quadrature current (e.g., q-axis current) component. Furthermore, FOC control schemes may provide high efficiency for and high-fidelity speed and/or position control. However, FOC control schemes are implemented in three-phase control systems. Accordingly, a linear compressor implementing a control scheme similar to a three-phase FOC control scheme is desired.

According to example aspects of the present disclosure, an appliance (e.g., a refrigerator appliance) can include a single-phase linear compressor driven by a single-phase linear motor. The linear compressor can decouple current control so as to implement dynamic flux weakening operations in a single-phase vector-like control scheme.

The systems and methods according to example embodiments of the present disclosure provide a number of technical effects and benefits. For instance, example aspects of the present disclosure provide a system and method for implementing a dynamic flux weakening operation. This is achieved by decoupling current control of the motor, as will be discussed in more detail below. In this way, DC, d-axis, and q-axis voltage component signals can be determined sequentially, which allows for sequential application of voltage limits. Limiting the DC voltage component signal, then limiting the d-axis voltage component signal prior to limiting the q-axis voltage component signal allows the motor to draw sufficient voltage to achieve a stroke specified for an application without running out of clearance. Further, the q-axis voltage component signal is then limited by the voltage remaining after generation of the DC voltage component signal and the d-axis voltage component signal. As such, the q-axis voltage component signal is minimized and adjusts based on the remaining voltage, which results in implementation of the dynamic flux weakening operation.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
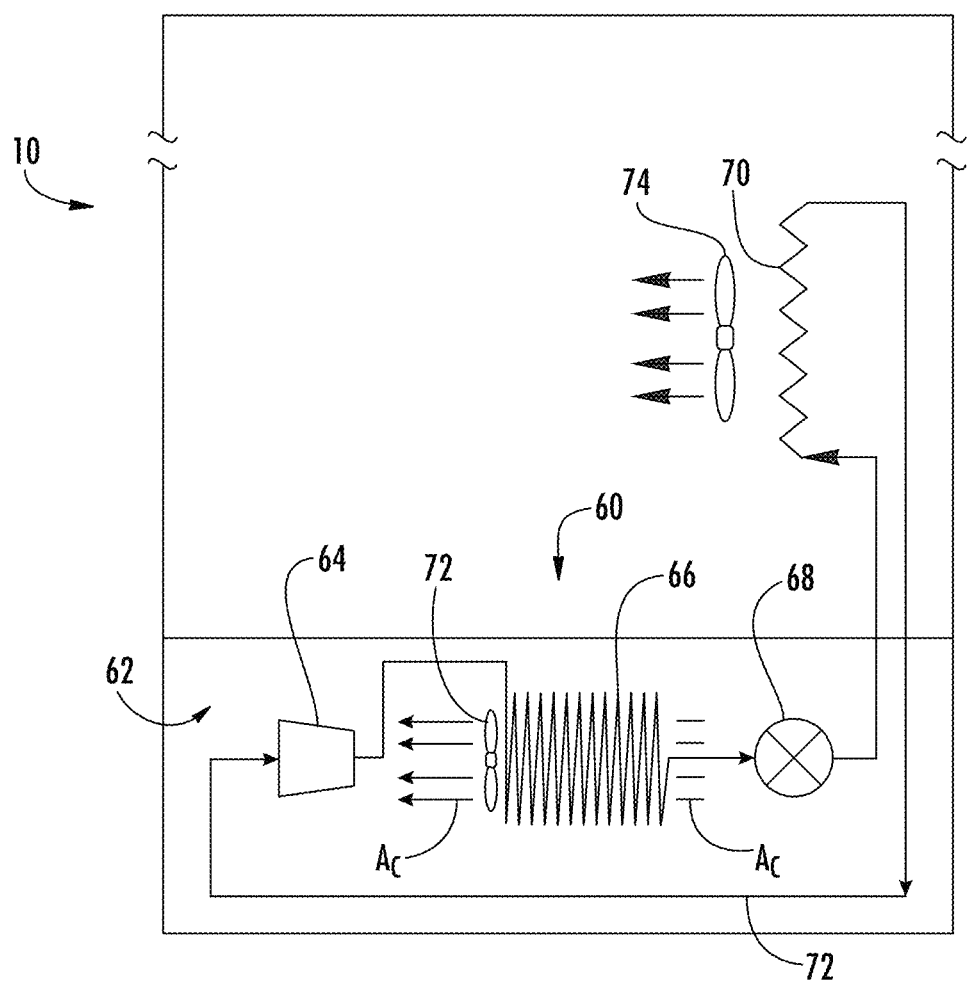
FIG. 2 depicts a schematic view of certain components of the example refrigerator appliance of FIG. 1 according to example embodiments of the present disclosure.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in refrigerator appliances. Thus, the present subject matter may be used for any other suitable purpose, such as vapor compression within air conditioning units or air compression within air compressors.

In the illustrated example embodiment shown in FIG. 1, the refrigerator appliance 10 is depicted as an upright refrigerator having a cabinet 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms. Due to the doors 16 being rotatably mounted to the cabinet 12, the doors 16 provide selective access to the internal chamber. As used herein, "internal chamber" refers to the internal chilled storage compartments defined by the cabinet 12.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series by fluid conduit 72 that is charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 74 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a valve, capillary tube, or other restriction device) receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

As described above, sealed refrigeration system 60 performs a vapor compression cycle to refrigerate compartments 14, 18 of refrigerator appliance 10. However, as is understood in the art, refrigeration system 60 is a sealed system that may be alternately operated as a refrigeration assembly (and thus perform a refrigeration cycle as described above) or a heat pump (and thus perform a heat pump cycle). Thus, for example, aspects of the present subject matter may similarly be used in a sealed system for an air conditioner unit, e.g., to perform by a refrigeration or cooling cycle and a heat pump or heating cycle. In this regard, when a sealed system is operating in a cooling mode and thus performs a refrigeration cycle, an indoor heat exchanger acts as an evaporator and an outdoor heat exchanger acts as a condenser. Alternatively, when the sealed system is operating in a heating mode and thus performs a heat pump cycle, the indoor heat exchanger acts as a condenser and the outdoor heat exchanger acts as an evaporator.

Figure 3:
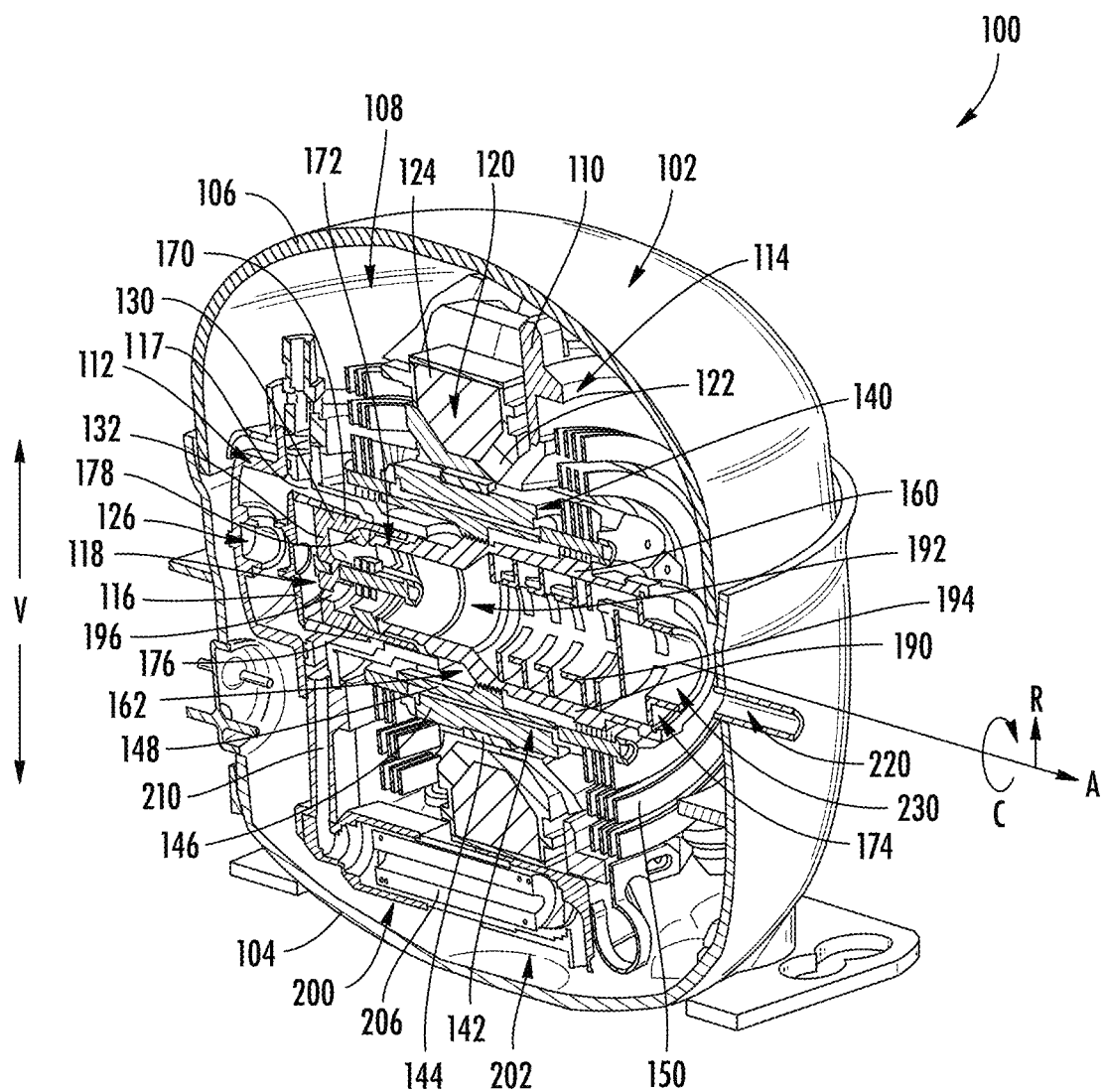
FIG. 3 depicts a perspective, section view of a linear compressor according to an exemplary embodiment of the present disclosure.
Figure 4:
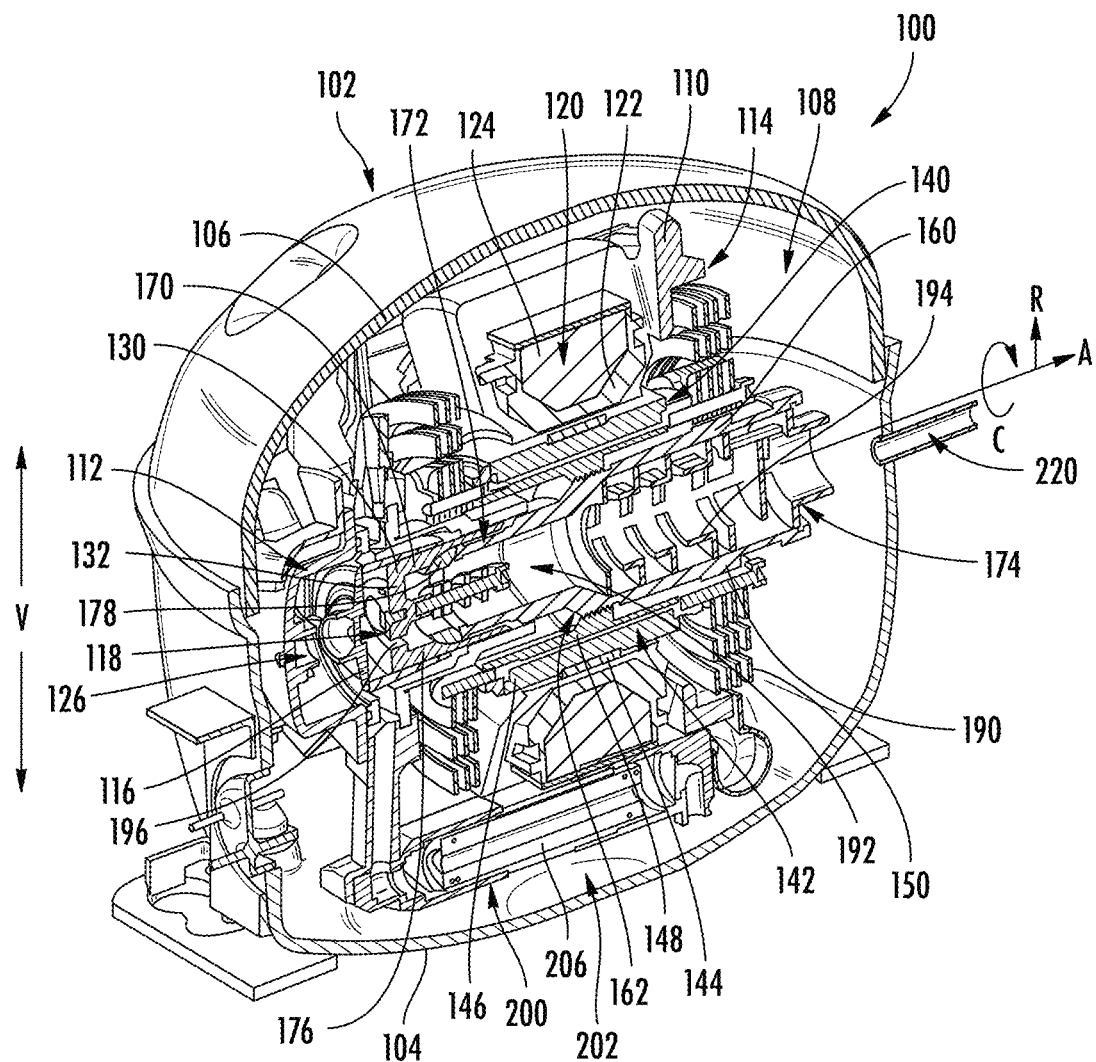
FIG. 4 depicts another perspective, section view of the exemplary linear compressor of FIG. 3 according to an embodiment of the present disclosure.
Figure 5:
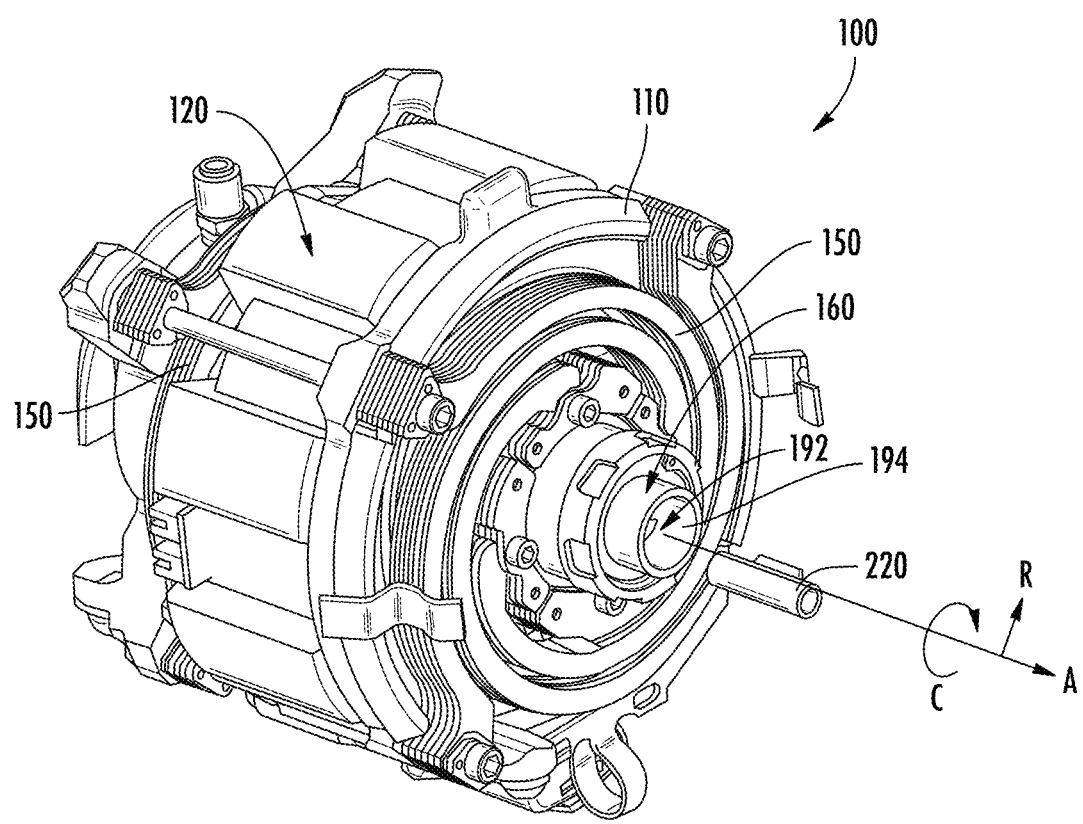
FIG. 5 depicts a perspective view of a linear compressor with a compressor housing removed for clarity according to an example embodiment of the present disclosure.
Figure 6:
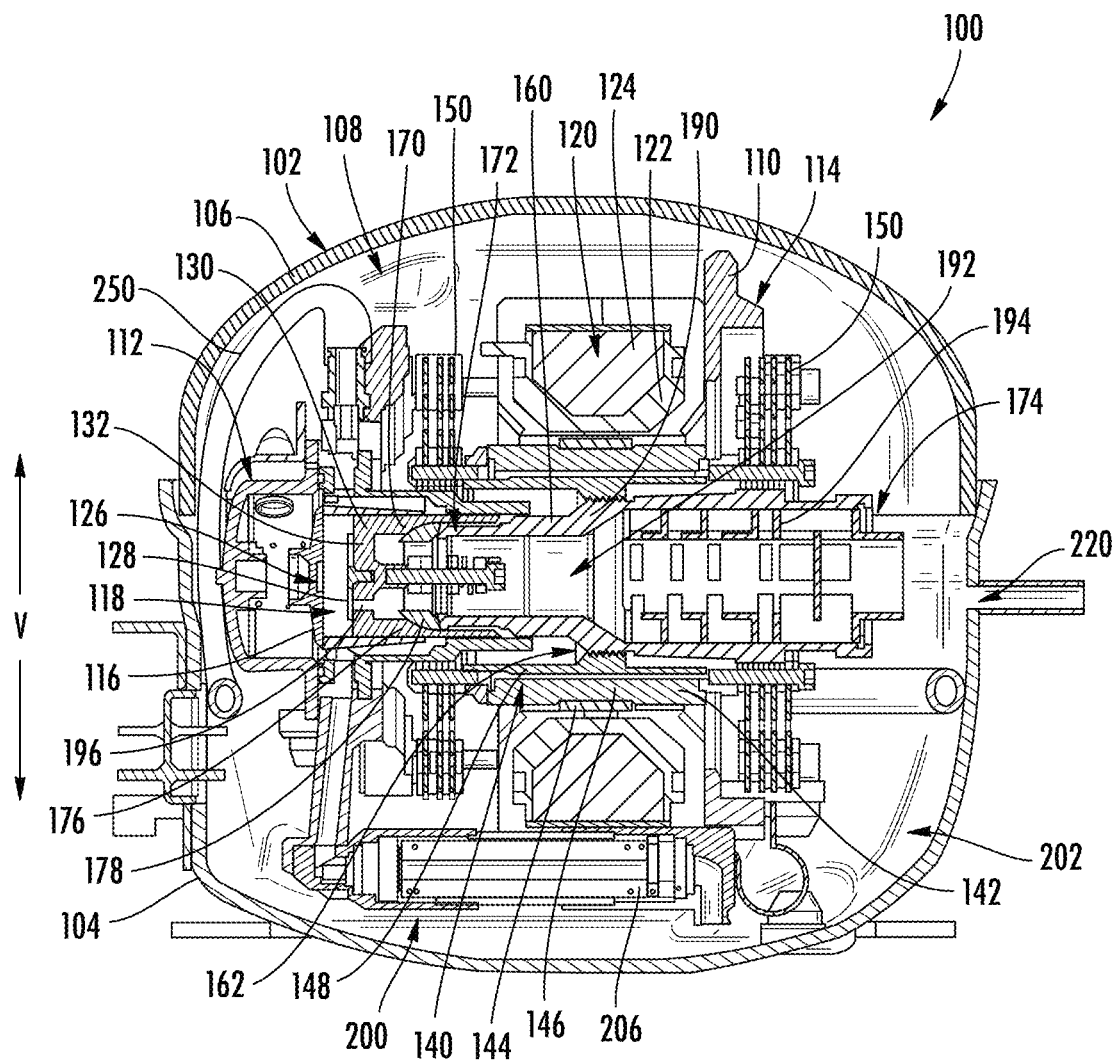
FIG. 6 depicts a section view of the exemplary linear compressor of FIG. 3 with a piston in an extended position according to an embodiment of the present subject disclosure.
Figure 7:
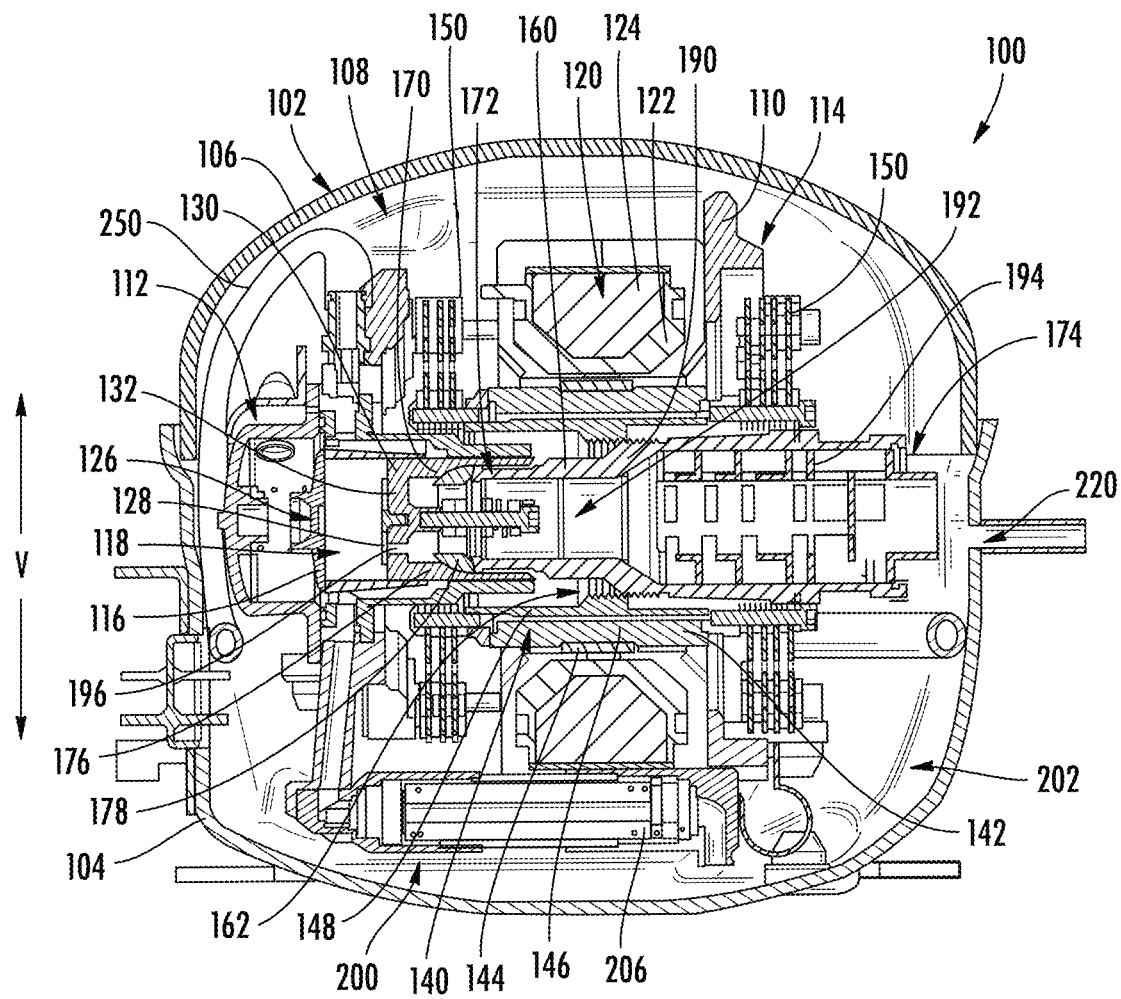
FIG. 7 depicts a section view of the exemplary linear compressor of FIG. 3 with the piston in a retracted position according to an embodiment of the present disclosure.

Referring now generally to FIGS. 3 through 7, a linear compressor 100 is described according to exemplary embodiments of the present subject matter. Specifically, FIGS. 3 and 4 provide perspective, section views of the linear compressor 100, FIG. 5 provides a perspective view of the linear compressor 100 with a compressor shell or housing 102 removed for clarity, and FIGS. 6 and 7 provide section views of the linear compressor when a piston thereof is in extended and retracted positions, respectively. It should be appreciated that the linear compressor 100 is used herein only as an exemplary embodiment to facilitate the description of aspects of the present subject matter. Modifications and variations may be made to the linear compressor 100 while remaining within the scope of the present subject matter.

As illustrated for example in FIGS. 3 and 4, the housing 102 may include a lower portion or lower housing 104 and an upper portion or upper housing 106 which are joined together to form a substantially enclosed cavity 108 for housing various components of linear compressor 100. Specifically, for example, cavity 108 may be a hermetic or air-tight shell that can house working components of linear compressor 100 and may hinder or prevent refrigerant from leaking or escaping from refrigeration system 60. In addition, linear compressor 100 generally defines an axial direction A, a radial direction R, and a circumferential direction C. It should be appreciated that linear compressor 100 is described and illustrated herein only to describe aspects of the present subject matter. Variations and modifications to linear compressor 100 may be made while remaining within the scope of the present subject matter.

Referring particularly to FIGS. 3 through 7, various parts and working components of the linear compressor 100 will be described according to an exemplary embodiment. As shown, the linear compressor 100 includes a casing 110 that extends between a first end portion 112 and a second end portion 114, e.g., along the axial direction A. The casing 110 includes a cylinder 117 that defines a compressor chamber 118. The cylinder 117 is positioned at or adjacent first end portion 112 of casing 110. The chamber 118 extends longitudinally along the axial direction A. As discussed in greater detail below, the linear compressor 100 is operable to increase a pressure of fluid within chamber 118 of linear compressor 100. Further, the linear compressor 100 may be used to compress any suitable fluid, such as refrigerant or air. In particular, the linear compressor 100 may be used in a refrigerator appliance, such as refrigerator appliance 10 (FIG. 1) in which the linear compressor 100 may be used as compressor 64 (FIG. 2).

Moreover, as shown, the linear compressor 100 includes a stator 120 of a motor that is mounted or secured to casing 110. For example, stator 120 generally includes an outer back iron 122 and a driving coil 124 that extend about the circumferential direction C within casing 110. The linear compressor 100 also includes one or more valves that permit refrigerant to enter and exit chamber 118 during operation of linear compressor 100. For example, a discharge muffler 126 is positioned at an end of chamber 118 for regulating the flow of refrigerant out of chamber 118, while a suction valve 128 (shown only in FIGS. 6-7 for clarity) regulates flow of refrigerant into chamber 118.

A piston 130 with a piston head 132 is slidably received within chamber 118 of cylinder 117. The piston 130 can be operably coupled to the motor. In particular, piston 130 is movable along the axial direction A. For instance, the piston 130 can be movable in a negative axial direction A toward the chamber 118. The piston 130 can be movable in a positive axial direction A away from the chamber 118. During sliding of piston head 132 within chamber 118, piston head 132 compresses refrigerant within chamber 118. As an example, from a top dead center position (see, e.g., FIG. 6), piston head 132 can slide within chamber 118 towards a bottom dead center position (see, e.g., FIG. 7) along the axial direction A, i.e., an expansion stroke of piston head 132. When piston head 132 reaches the bottom dead center position, piston head 132 changes directions and slides in chamber 118 back towards the top dead center position, i.e., a compression stroke of piston head 132. It should be understood that the linear compressor 100 may include an additional piston head and/or additional chambers at an opposite end of linear compressor 100. Thus, linear compressor 100 may have multiple piston heads in alternative exemplary embodiments.

As illustrated, the linear compressor 100 also includes a mover 140 which is generally driven by stator 120 for compressing refrigerant. Specifically, for example, mover 140 may include an inner back iron 142 positioned in stator 120 of the motor. In particular, outer back iron 122 and/or driving coil 124 may extend about inner back iron 142, e.g., along the circumferential direction C. Inner back iron 142 also has an outer surface that faces towards outer back iron 122 and/or driving coil 124. At least one driving magnet 144 is mounted to inner back iron 142, e.g., at the outer surface of inner back iron 142.

Driving magnet 144 may face and/or be exposed to driving coil 124. In particular, driving magnet 144 may be spaced apart from driving coil 124, e.g., along the radial direction R by an air gap. Thus, the air gap may be defined between opposing surfaces of driving magnet 144 and driving coil 124. Driving magnet 144 may also be mounted or fixed to inner back iron 142 such that an outer surface of driving magnet 144 is substantially flush with the outer surface of inner back iron 142. Thus, driving magnet 144 may be inset within inner back iron 142. In such a manner, the magnetic field from driving coil 124 may have to pass through only a single air gap between outer back iron 122 and inner back iron 142 during operation of the linear compressor 100, and the linear compressor 100 may be more efficient relative to linear compressors with air gaps on both sides of a driving magnet.

As may be seen in FIG. 3, the driving coil 124 extends about inner back iron 142, e.g., along the circumferential direction C. In alternative example embodiments, inner back iron 142 may extend around driving coil 124 along the circumferential direction C. The driving coil 124 is operable to move the inner back iron 142 along the axial direction A during operation of driving coil 124. As an example, a current may be induced within driving coil 124 by a current source (not shown) to generate a magnetic field that engages driving magnet 144 and urges piston 130 to move along the axial direction A in order to compress refrigerant within chamber 118 as described above and will be understood by those skilled in the art. In particular, the magnetic field of driving coil 124 may engage driving magnet 144 in order to move inner back iron 142 and piston head 132 along the axial direction A during operation of driving coil 124. Thus, the driving coil 124 may slide the piston 130 between the top dead center position and the bottom dead center position, e.g., by moving inner back iron 142 along the axial direction A, during operation of driving coil 124.

Figure 8:
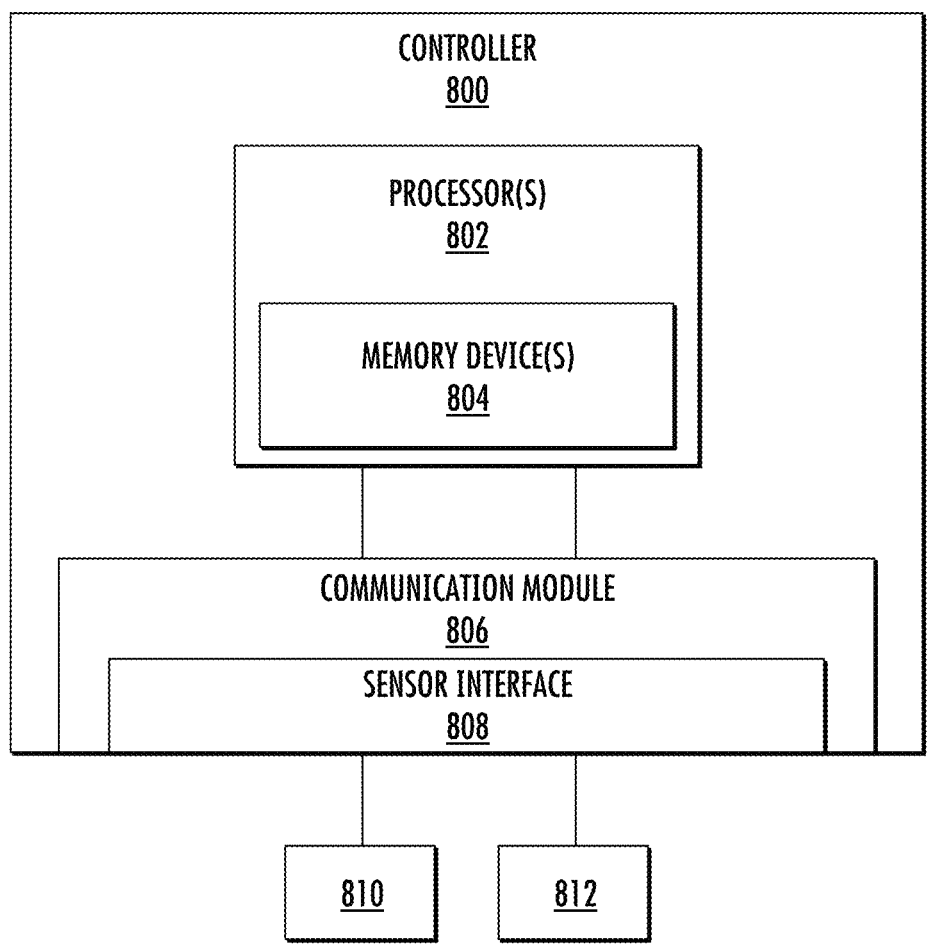
FIG. 8 depicts a block diagram of one embodiment of a controller of a refrigerator appliance according to example embodiments of the present disclosure.

Referring particularly to FIG. 8, operation of the refrigerator appliance 10 may generally be controlled by a processing device or controller 800. The controller 800 may, for example, be operatively coupled to the control panel 24 for user manipulation to select features and operations of the refrigerator appliance 10, such as temperature set points. Thus, the controller 800 can operate various components of the refrigerator appliance 10 to execute selected system cycles, processes, and/or features. In exemplary embodiments, the controller 800 is in operative communication (e.g., electrical or wireless communication) with each of the chambers or compartments therein, for example, to regulate temperature as described herein.

More specifically, as shown in FIG. 8, a block diagram of one embodiment of suitable components that may be included within the controller 800 in accordance with example aspects of the present disclosure is illustrated. As shown, the controller 800 may include one or more processor(s) 802, computer, or other suitable processing unit and associated memory device(s) 804 that may include suitable computer-readable instructions that, when implemented, configure the controller to perform various different functions, such as receiving, transmitting and/or executing signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 804 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. The memory can be a separate component from the processor or can be included onboard within the processor.

Such memory device(s) 804 may generally be configured to store suitable computer-readable instructions that, when implemented by the processor(s) 802, configure the controller to perform various functions as described herein. In particular, the processor(s) 802 can include microprocessors, CPUs or the like, such as general or special purpose microprocessors operable to execute programming instructions or micro-control code associated with operation of the linear compressor 100. Additionally, the controller 800 may also include a communications module 806 to facilitate communications between the controller and the various components of the refrigerator appliance 10. An interface can include one or more circuits, terminals, pins, contacts, conductors, or other components for sending and receiving control signals. Moreover, the controller 800 may include a sensor interface 808 (e.g., one or more analog-to-digital converters) to permit signals transmitted from the temperature probe(s) 810 to be converted into signals that can be understood and processed by the processor(s) 802. The controller 800 may furthermore optionally receive a second temperature signal (s) from the thermistor(s) 812 configured to generate one or more second temperature signals representative of the actual temperature of the item or the chamber.

Alternatively, the controller 800 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The inner back iron 142 further includes an outer cylinder 146 and an inner sleeve 148. The outer cylinder 146 defines the outer surface of inner back iron 142 and also has an inner surface positioned opposite the outer surface of outer cylinder 146. The inner sleeve 148 is positioned on or at inner surface of outer cylinder 146. A first interference fit between outer cylinder 146 and inner sleeve 148 may couple or secure outer cylinder 146 and inner sleeve 148 together. In alternative exemplary embodiments, inner sleeve 148 may be welded, glued, fastened, or connected via any other suitable mechanism or method to outer cylinder 146.

The outer cylinder 146 may be constructed of or with any suitable material. For example, outer cylinder 146 may be constructed of or with a plurality of (e.g., ferromagnetic) laminations. The laminations are distributed along the circumferential direction C in order to form outer cylinder 146 and are mounted to one another or secured together, e.g., with rings pressed onto ends of the laminations. The outer cylinder 146 may define a recess that extends inwardly from the outer surface of outer cylinder 146, e.g., along the radial direction R. The driving magnet 144 is positioned in the recess on outer cylinder 146, e.g., such that the driving magnet 144 is inset within outer cylinder 146.

The linear compressor 100 also includes a plurality of planar springs 150. Each planar spring 150 may be coupled to a respective end of inner back iron 142, e.g., along the axial direction A. During operation of driving coil 124, planar springs 150 support inner back iron 142. In particular, the inner back iron 142 is suspended by planar springs 150 within the stator or the motor of the linear compressor 100 such that motion of inner back iron 142 along the radial direction R is hindered or limited while motion along the axial direction A is relatively unimpeded. Thus, the planar springs 150 may be substantially stiffer along the radial direction R than along the axial direction A. In such a manner, planar springs 150 can assist with maintaining a uniformity of the air gap between driving magnet 144 and driving coil 124, e.g., along the radial direction R, during operation of the motor and movement of inner back iron 142 on the axial direction A. The planar springs 150 can also assist with hindering side pull forces of the motor from transmitting to piston 130 and being reacted in cylinder 117 as a friction loss.

A flex mount 160 is mounted to and extends through inner back iron 142. In particular, the flex mount 160 is mounted to inner back iron 142 via inner sleeve 148. Thus, the flex mount 160 may be coupled (e.g., threaded) to inner sleeve 148 at the middle portion of inner sleeve 148 and/or flex mount 160 in order to mount or fix flex mount 160 to inner sleeve 148. The flex mount 160 may assist with forming a coupling 162. The coupling 162 connects inner back iron 142 and piston 130 such that motion of inner back iron 142, e.g., along the axial direction A, is transferred to piston 130.

The coupling 162 may be a compliant coupling that is compliant or flexible along the radial direction R. In particular, coupling 162 may be sufficiently compliant along the radial direction R such that little or no motion of inner back iron 142 along the radial direction R is transferred to piston 130 by coupling 162. In such a manner, side pull forces of the motor are decoupled from piston 130 and/or cylinder 117 and friction between piston 130 and cylinder 117 may be reduced.

As may be seen in the figures, the piston head 132 of piston 130 has a piston cylindrical side wall 170. The cylindrical side wall 170 may extend along the axial direction A from piston head 132 towards inner back iron 142. An outer surface of cylindrical side wall 170 may slide on cylinder 117 at chamber 118 and an inner surface of cylindrical side wall 170 may be positioned opposite the outer surface of cylindrical side wall 170. Thus, the outer surface of cylindrical side wall 170 may face away from a center of cylindrical side wall 170 along the radial direction R, and the inner surface of cylindrical side wall 170 may face towards the center of cylindrical side wall 170 along the radial direction R.

The flex mount 160 extends between a first end portion 172 and a second end portion 174, e.g., along the axial direction A. According to an exemplary embodiment, the inner surface of cylindrical side wall 170 defines a ball seat 176 proximate first end portion. In addition, coupling 162 also includes a ball nose 178. Specifically, for example, the ball nose 178 is positioned at first end portion 172 of flex mount 160, and ball nose 178 may contact flex mount 160 at first end portion 172 of flex mount 160. In addition, ball nose 178 may contact piston 130 at ball seat 176 of piston 130. In particular, ball nose 178 may rest on ball seat 176 of piston 130 such that ball nose 178 is slidable and/or rotatable on ball seat 176 of piston 130. For example, ball nose 178 may have a frusto-spherical surface positioned against ball seat 176 of piston 130, and ball seat 176 may be shaped complementary to the frusto-spherical surface of ball nose 178. The frusto-spherical surface of ball nose 178 may slide and/or rotate on ball seat 176 of piston 130.

Relative motion between the flex mount 160 and the piston 130 at the interface between ball nose 178 and ball seat 176 of piston 130 may provide reduced friction between piston 130 and cylinder 117, e.g., compared to a fixed connection between flex mount 160 and piston 130. For example, when an axis on which piston 130 slides within cylinder 117 is angled relative to the axis on which inner back iron 142 reciprocates, the frusto-spherical surface of ball nose 178 may slide on ball seat 176 of piston 130 to reduce friction between piston 130 and cylinder 117 relative to a rigid connection between inner back iron 142 and piston 130.

Further, as shown, the flex mount 160 is connected to the inner back iron 142 away from first end portion 172 of flex mount 160. For example, flex mount 160 may be connected to inner back iron 142 at second end portion 174 of flex mount 160 or between first and second end portions 172, 174 of flex mount 160. Conversely, the flex mount 160 is positioned at or within piston 130 at first end portion 172 of flex mount 160, as discussed in greater detail below.

In addition, the flex mount 160 includes a tubular wall 190 between inner back iron 142 and piston 130. A channel 192 within tubular wall 190 is configured for directing compressible fluid, such as refrigerant or air, though flex mount 160 towards piston head 132 and/or into piston 130. Inner back iron 142 may be mounted to flex mount 160 such that inner back iron 142 extends around tubular wall 190, e.g., at the middle portion of flex mount 160 between first and second end portions 172, 174 of flex mount 160. Channel 192 may extend between first and second end portions 172, 174 of flex mount 160 within tubular wall 190 such that the compressible fluid is flowable from first end portion 172 of flex mount 160 to second end portion 174 of flex mount 160 through channel 192. In such a manner, compressible fluid may flow through inner back iron 142 within flex mount 160 during operation of the linear compressor 100. A muffler 194 may be positioned within channel 192 within tubular wall 190, e.g., to reduce the noise of compressible fluid flowing through channel 192.

The piston head 132 also defines at least one opening 196. Opening 196 of piston head 132 extends, e.g., along the axial direction A, through piston head 132. Thus, the flow of fluid may pass through piston head 132 via opening 196 of piston head 132 into chamber 118 during operation of the linear compressor 100. In such a manner, the flow of fluid (that is compressed by piston head 132 within chamber 118) may flow within channel 192 through flex mount 160 and inner back iron 142 to piston 130 during operation of the linear compressor 100. As explained above, suction valve 128 (FIGS. 6-7) may be positioned on piston head 132 to regulate the flow of compressible fluid through opening 196 into chamber 118.

Referring still to FIGS. 3 through 7, the linear compressor 100 may also include a lubrication system 200 for circulating a lubricant, e.g., such as oil, through the working or moving components of the linear compressor 100 to reduce friction, improve efficiency, etc. For example, as shown, the housing 102 may generally defines a sump 202 which is configured for collecting oil. Specifically, the sump 202 may be defined in the bottom portion of lower housing 104. The lubrication system 200 further includes a pump 206 for continuously circulating oil through components of the linear compressor 100 which need lubrication.

As also illustrated in the figures, the linear compressor 100 may include a suction inlet 220 for receiving a flow of refrigerant. Specifically, as shown, the suction inlet 220 may be defined on the housing 102 (e.g., such as on lower housing 104), and may be configured for receiving a refrigerant supply conduit to provide refrigerant to the cavity 108. As explained above, the flex mount 160 includes tubular wall 190, which defines channel 192 for directing compressible fluid, such as refrigerant gas, through flex mount 160 towards piston head 132. In this manner, desirable flow path of refrigerant gas is through suction inlet 220, through channel 192, through opening 196, and into chamber 118. Suction valve 128 may block opening 196 during a compression stroke and a discharge valve 116 may permit the compressed gas to exit chamber 118 when the desired pressure is reached.

Figure 9:
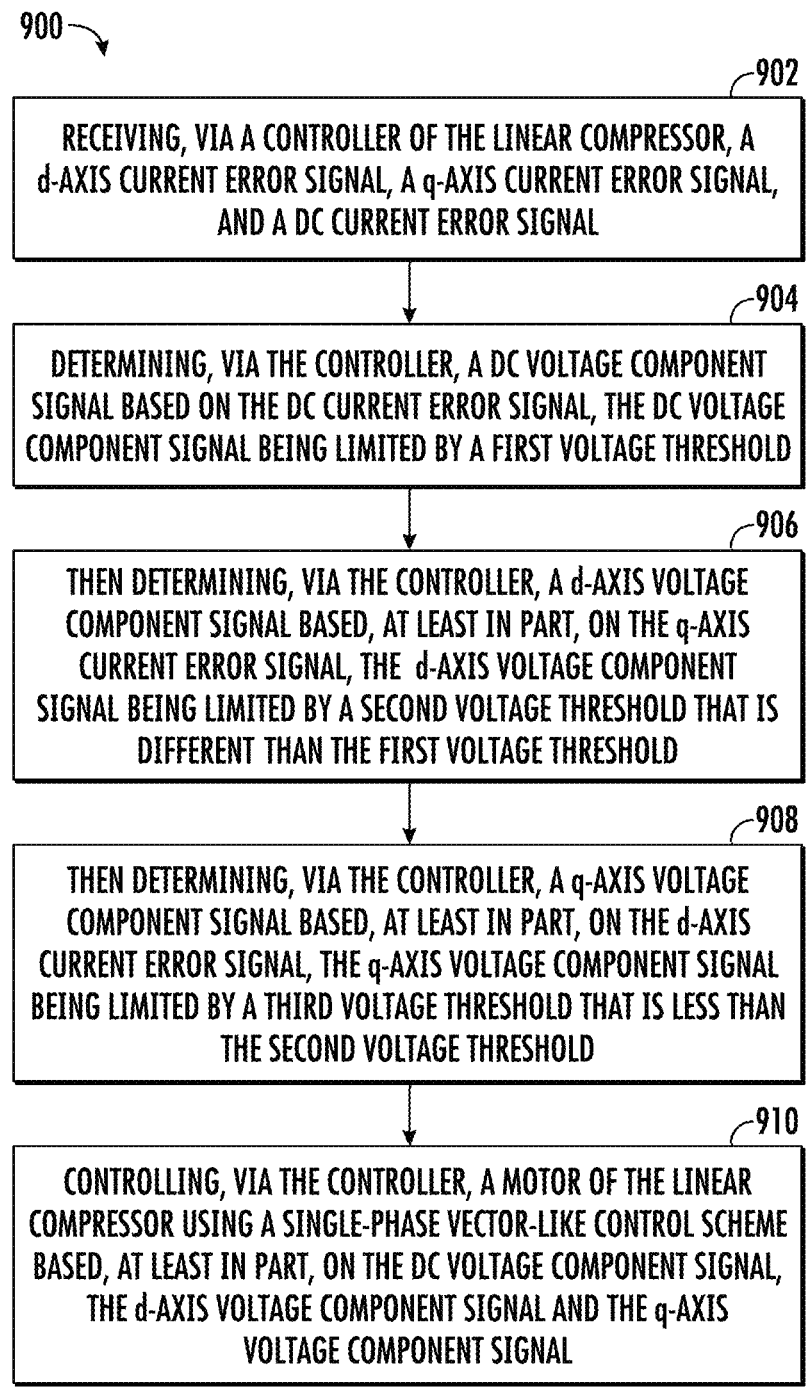
FIG. 9 depicts an example method for operating a linear compressor according to example embodiments of the present disclosure.
Figure 11:
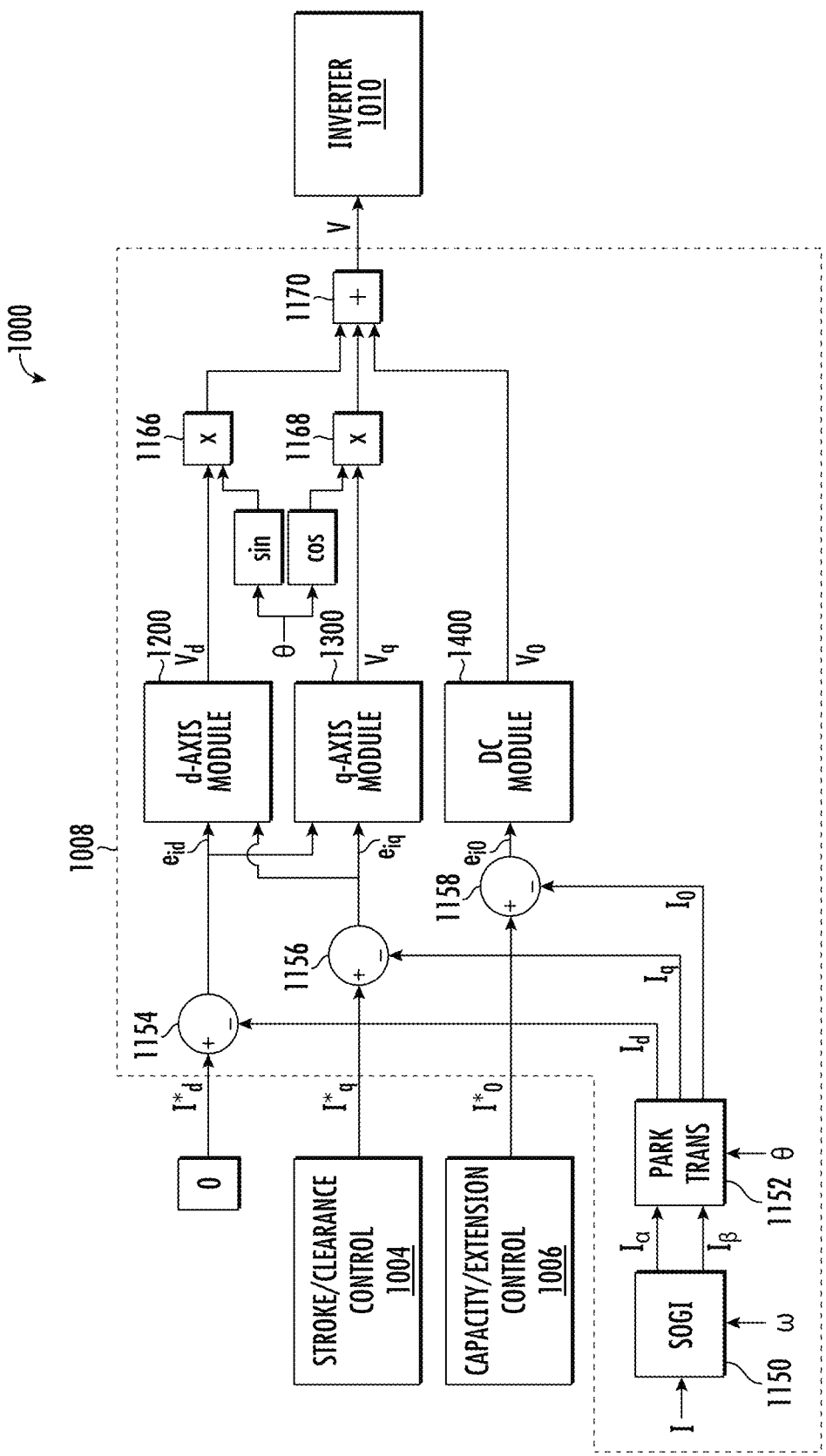
FIG. 11 depicts an example single-phase vector-like control scheme implemented by the controller of FIG. 10 according to example embodiments of the present disclosure.

FIG. 9 depicts a flow diagram of an example method 900 for operating a linear compressor of an appliance according to example embodiments of the present disclosure. More particularly, the method 900 can be implemented to control a linear compressor of a refrigerator appliance (e.g., as depicted in FIGS. 1-2) using a single-phase vector-like control scheme (e.g., as depicted in FIG. 11). FIG. 9 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 900 is generally discussed with reference to the refrigerator appliance 10 described above with reference to FIGS. 1-2 and the linear compressor 100 described above with reference to FIGS. 3-8. However, it should be understood that aspects of the present method 900 can find application with any suitable appliance and/or linear compressor.

Figure 10:
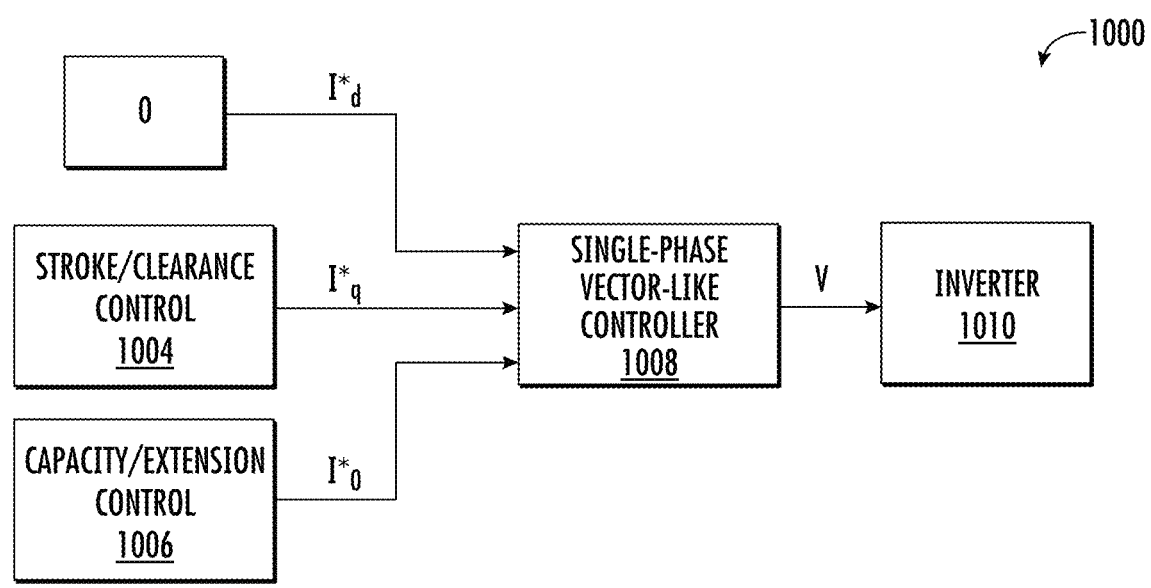
FIG. 10 depicts an example control scheme operable to control a linear compressor according to example embodiments of the present disclosure.

As noted above, the method 900 provides a method for controlling a linear compressor (e.g., linear compressor 100) of an appliance (e.g., refrigerator appliance 10). For instance, a motor of the linear compressor can be operated in order to drive a rotor of the motor. In some embodiments, the linear compressor can include a single-phase motor such as, e.g., a single-phase linear motor. More particularly, a controller can be configured to implement a control scheme (e.g., a single-phase vector-like control scheme 1000 (e.g., as depicted in FIGS. 10-11)) to operate a motor of the linear compressor (e.g., linear compressor 100) in order to drive a rotor (e.g., rotor coupled to piston 130) of the motor.

The method 900 can include, at (902), receiving, via a controller (e.g., a single-phase vector-like controller 1008), a DC current error signal ($e_{i0}$), a d-axis current error signal ($e_{id}$), and a q-axis current error signal ($e_{iq}$). For example, target current component signals ($I_0^*$), ($I_q^*$), ($I_d^*$) can be compared to measured current component signals ($I_0$), ($I_q$), ($I_d$) to determine the DC current error signal ($e_{i0}$), the d-axis current error signal ($e_{id}$), and the q-axis current error signal ($e_{iq}$).

The method 900 may also include, at (904), determining, via the controller, a DC voltage component signal ($V_0$) based on the DC current error signal ($e_{i0}$). For instance, the controller can be designed so as to decouple the voltage component signals ($V_q$), ($V_d$) from the current error signals ($e_{iq}$), ($e_{id}$), as will be described in more detail below in regards to FIGS. 10-11. As such, the DC voltage component signal ($V_0$) can be determined sequentially before a d-axis voltage component signal ($V_d$) and a q-axis voltage component signal ($V_q$). The DC voltage component signal ($V_0$) may be limited by a first voltage threshold.

The method 900 may also include, at (906), then determining, via the controller, a d-axis voltage component signal ($V_d$) based, at least in part, on the q-axis current error signal ($e_{iq}$). Because the voltage component signals ($V_q$), ($V_d$) can be decoupled from the current error signals ($e_{iq}$), ($e_{id}$), the d-axis voltage component signal ($V_d$) can be determined sequentially before the q-axis voltage component signal ($V_q$). The d-axis voltage component signal ($V_d$) may be limited by a second voltage threshold. The second voltage threshold may be less than the first voltage threshold. The second voltage threshold may be a variable voltage dependent on at least the DC voltage component signal ($V_0$).

The method 900 may also include, at (908), then determining, via the controller, the q-axis voltage component signal ($V_q$) based, at least in part, on the d-axis current error signal ($e_{id}$). The q-axis voltage component signal ($V_q$) may be limited by a third voltage threshold. The third voltage threshold may be less than the second voltage threshold. The third voltage threshold may be a variable voltage dependent on at least the second voltage threshold and the d-axis voltage component signal ($V_d$).

Determining the DC voltage component signal ($V_0$) and the d-axis voltage component signal ($V_d$) prior to determining the q-axis voltage component signal ($V_q$) allows for optimal utilization of the DC bus voltage to achieve a q-axis target current component signal ($I_q^*$) and a DC target current component signal ($I_0^*$). More specifically, the q-axis voltage component signal ($V_q$) may be unable to achieve the target d-axis current component signal ($I_d^*$) when the frequency of the motor is greater than a pole frequency of the motor. As such, a negative d-axis current component signal ($I_d$) may result from the q-axis voltage component signal ($V_q$) being limited by the third voltage threshold. Accordingly, a flux weakening operation may be implemented by limiting the q-axis voltage component signal ($V_q$) by the third voltage threshold and may be dynamically adjusted in response to changes to the third voltage threshold.

The method 900 may also include, at (910), controlling, via the controller, the motor using the single-phase vector-like control scheme based, at least in part, on the DC voltage component signal ($V_0$), the d-axis voltage component signal ($V_d$), and the q-axis voltage component signal ($V_q$).

Figure 12A:
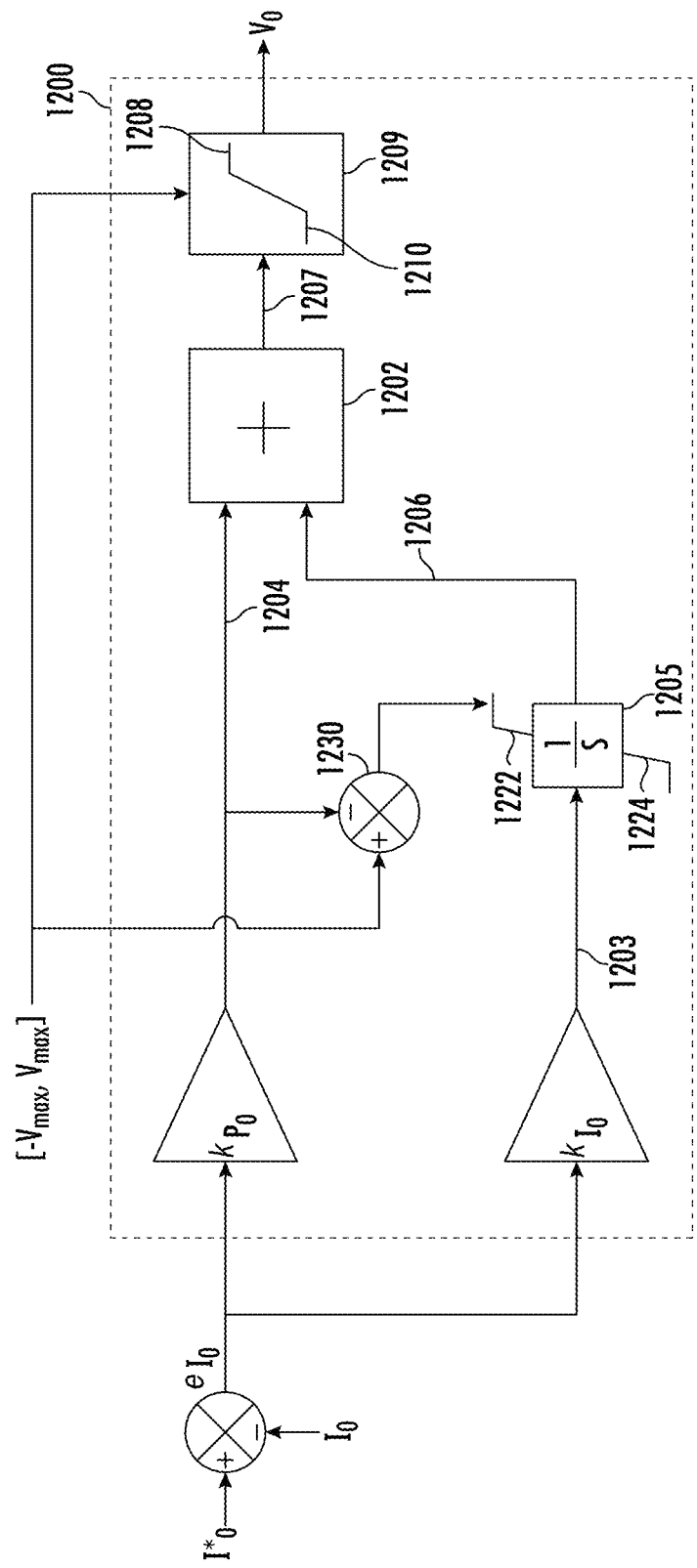
FIG. 12A provides a control diagram of an example embodiment of a DC voltage calculation module of a controller (e.g., from the control scheme of FIG. 11) according to one or more example embodiments of the present disclosure.
Figure 12B:
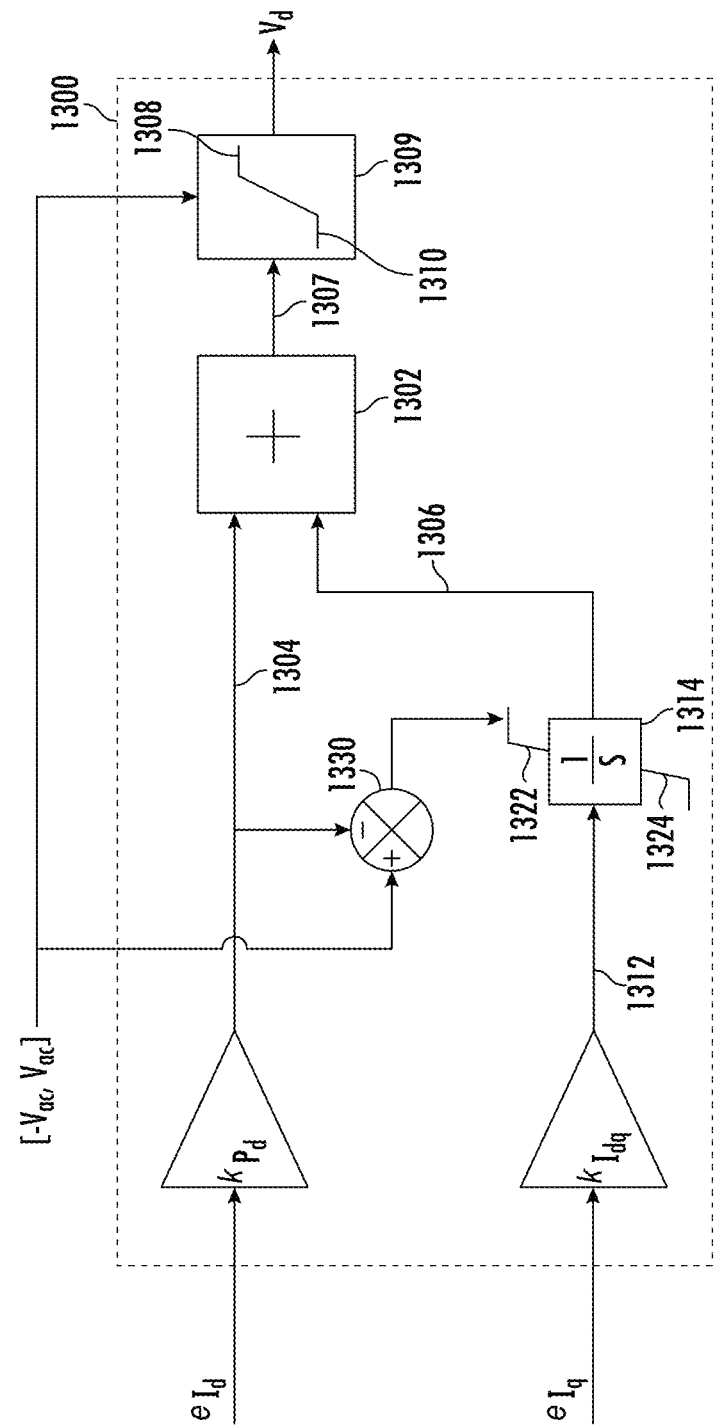
FIG. 12B provides a control diagram of an example embodiment of a d-axis voltage calculation module of controller (e.g., from the control scheme of FIG. 11) according to one or more example embodiments of the present disclosure.
Figure 12C:
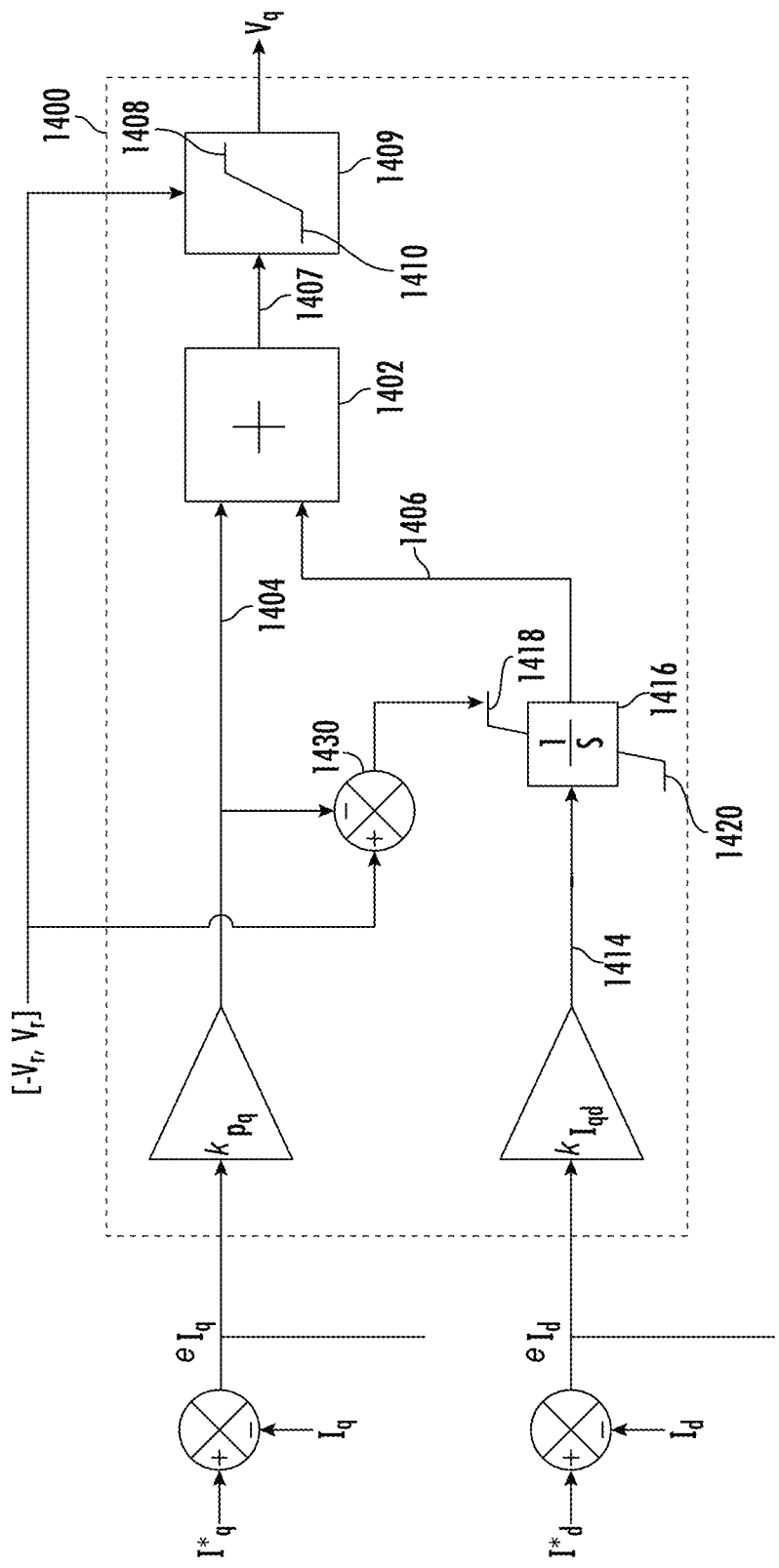
FIG. 12C provides a control diagram of an example embodiment of a q-axis voltage calculation module of controller (e.g., from the control scheme of FIG. 11) according to one or more example embodiments of the present disclosure.

The method of FIG. 9 can be better understood with reference to FIGS. 10-12C. In particular, FIG. 10 depicts an example control scheme operable to control a linear compressor (e.g., linear compressor 100) of an appliance (e.g., refrigerator appliance 10) according to example embodiments of the present disclosure. FIG. 11 depicts an example embodiment of a single-phase vector-like controller 1008 implementing single-phase DQ0 control. FIGS. 12A-12C illustrate control diagrams of example voltage calculation modules of the single-phase vector-like controller 1008 according to one or more exemplary embodiments of the present disclosure. In particular, FIG. 12A illustrates a control diagram for a DC voltage calculation module 1200 programmed in the single-phase vector-like controller 1008 according to the present disclosure. FIG. 12B illustrates a control diagram for a d-axis voltage calculation module 1300 programmed in the single-phase vector-like controller 1008 according to the present disclosure. FIG. 12C illustrates a control diagram for a q-axis voltage calculation module 1400 programmed in the single-phase vector-like controller 1008 according to the present disclosure.

As shown in the embodiment illustrated in FIG. 10, a controller can be operably coupled to the motor of the linear compressor and can be configured to implement a single-phase vector-like control scheme (e.g., control scheme 1000) to operate a motor of the linear compressor in order to drive a rotor (e.g., rotor coupled to piston 130) of the motor. More particularly, the control scheme 1000 can include a stroke controller 1004 (e.g., clearance controller 1004), and a capacity controller 1006 (e.g., extension controller 1006). As discussed in more detail below, a d-axis current component of the motor can be specified, the stroke controller 1004 (e.g., clearance controller 1004) can be configured to control a q-axis current component of the motor, and the capacity controller 1006 (e.g., extension controller 1006) can be configured to control a target DC current component of the motor. Furthermore, as will be discussed in more detail below with reference to FIG. 11, the control scheme 1000 can further include a single-phase vector-like controller 1008. The single-phase vector-like controller 1008 can be operatively coupled to the stroke controller 1004 and the capacity controller 1006. The control scheme 1000 can further include an inverter 1010 configured to supply a variable frequency waveform to the motor. Furthermore, as will be discussed in greater detail below, the single-phase vector-like controller 1008 can be configured to determine the requisite voltage needed by the inverter 1010 in order to drive the motor based, at least in part, on the d-axis current component, the q-axis current component, and the DC current component.

As noted above, in some embodiments, the motor can be a single-phase linear motor. The single-phase linear motor can have a stator and a rotor. The rotor can be operatively coupled to a piston (e.g., a reciprocating piston) that compresses gas when operated. In some embodiments, the piston can be fitted with springs in order to allow resonant oscillation to facilitate the compression by the piston.

A total magnetic flux ($\lambda$) produced by the motor includes a rotor component ($\lambda_r$) and a stator component ($\lambda_s$). When the rotor is centered in the stator (i.e., x=0), total rotor flux ($\lambda_r$) linked to the stator is zero. When the rotor moves forward and/or backward from the center of the stator, the rotor flux ($\lambda_r$) increases and decreases, respectively, in a linear manner. Moreover, windings of the stator produce a stator flux proportional to a winding current in the stator winding (I) by the inductance (L). More particularly, the total flux ($\lambda$) is given by:

$$\lambda_r \approx \alpha x$$

$$\lambda_s = LI$$

$$\lambda = \lambda_s + \lambda_r = LI + \alpha x$$

When the total flux ($\lambda$) changes, an electromotive force voltage (EMF) is produced in the motor. More particularly, the EMF ($\varepsilon$) is given by:

$$\varepsilon = \dot{\lambda} = L\dot{I} + \alpha \dot{x}$$

where $\dot{\lambda}$ is a time derivative of the total flux, $\dot{I}$ is a time derivative of the stator winding current, $\dot{x}$ is a time derivative of the rotor position, and $\alpha$ is a motor constant. Furthermore, $\alpha\dot{x}$ represents a back-EMF voltage (back-EMF) of the motor.

Taking into account the above-mentioned equation for the total EMF, a total voltage (V) for the motor is given by:

$$V = RI + L\dot{I} + \alpha\dot{x}$$

where R is a resistance of the stator windings.

As noted above, in some embodiments, the piston can be fitted with springs to allow the resonant oscillation to facilitate the compression by the piston. More particularly, the piston oscillates in an approximately sinusoidal manner. The sinusoidal oscillation of the piston is given by:

$$x(t) = x_1 \sin\theta + x_0$$

where $\theta$ represents a piston displacement phase angle, $x_1$ represents an amplitude of the piston displacement, and $x_0$ represents a midpoint of the piston displacement. Those of ordinary skill in the art will understand that the asymmetric force of gas compression can induce a positive offset in the position of the sine waveform.

Taking the above-equation, the time derivative of the rotor position (for use in the total motor voltage equation) can be derived. More particularly, the time derivative of the rotor position is given by:

$$\dot{x}(t) = \omega x_1 \cos\theta$$

where $\omega = \dot{\theta}$. As used herein, "velocity equation" refers to the above-described equation.

Referring still to FIG. 10, the control scheme 1000 can be configured to control the amplitude of the motor current (I) and the relative phase between the motor current (I) and the back-EMF. Those of ordinary skill in the art will understand that current which is in-phase with the back-EMF generates a net force which increases stroke and capacity of the linear compressor. Likewise, those of ordinary skill in the art will understand that current which is out-of-phase with the back-EMF does not generate a net force but does affect the total voltage (V) needed by the inverter (e.g., inverter 1010) to drive the motor. In this way, the out-of-phase current can be useful for flux weakening operations.

The piston displacement phase angle ($\theta$) can be used to define an in-phase component and an out-of-phase component of the sinusoidal motor current (I). The total motor current (I) and its time derivative ($\dot{I}$) are given by:

$$I(t) = I_d \sin\theta + I_q \cos\theta + I_0$$

$$\dot{I}(t) = \dot{I}_d \sin\theta + \omega I_d \cos\theta + \dot{I}_q \cos\theta - \omega I_q \sin\theta + \dot{I}_0$$

where $I_d$ is the amplitude of the current component that is out-of-phase with the back-EMF (i.e., in-phase with the rotor flux), $I_q$ is the amplitude of the current component that is in-phase with the back-EMF (i.e., out-of-phase with the rotor flux), and $I_0$ is the amplitude of the DC current.

Thus, substituting I(t), $\dot{I}$(t), and $\dot{x}$(t) into the total voltage (V) for the motor can be represented:

$$V = (RI_d + L\dot{I}_d - L\omega I_q)\sin\theta + (RI_q + L\dot{I}_q + L\omega I_d + \alpha\omega x_1)\cos\theta + RI_0 + L\dot{I}_0$$

$$V = V_d \sin\theta + V_q \cos\theta + V_0$$

where $V_d$ is the amplitude of the voltage component that is out-of-phase with the back-EMF (i.e., in-phase with the rotor flux), $V_q$ is the amplitude of the voltage component that is in-phase with the back-EMF (i.e., out-of-phase with the rotor flux), and $V_0$ is the amplitude of the DC voltage.

As such, in the dq frame, the electrical dynamics of the stator windings can be given by:

$$\begin{bmatrix} V_d \\ V_q \\ V_0 \end{bmatrix} = \begin{bmatrix} (sL+R) & -L\omega & 0 \\ L\omega & (sL+R) & 0 \\ 0 & 0 & (sL+R) \end{bmatrix} \begin{bmatrix} I_d \\ I_q \\ I_0 \end{bmatrix} + \begin{bmatrix} 0 \\ \alpha\omega x_1 \\ 0 \end{bmatrix}$$

where s is a Laplace variable. Those of ordinary skill in the art will understand that the above-described equations directly parallel the dq voltage equations for a three-phase permanent magnet synchronous motor (PMSM). In this way, the present disclosure provides a single-phase vector-like control scheme that is analogous to a field-oriented control scheme commonly used in three-phase motors such as, e.g., PMSMs and brushless DC (BLDC) motors.

In some embodiments, the d-axis current component of the motor current can be specified. More particularly, a d-axis target current component signal ($I_d^*$) can be set to zero, as shown. In other embodiments, the control scheme 1000 may include a flux weakening controller (not shown) configured to control the d-axis current component of the motor current. In such embodiments, the flux weakening controller may be configured to determine the target d-axis current component ($I_d^*$). For instance, the flux weakening controller can be configured to adjust the target d-axis current component ($I_d^*$) based, at least in part, on one or more feedback measurements (e.g., current feedback, voltage feedback, etc.) of one or more electrical characteristics (e.g., current, voltage, magnetic flux, etc.) of the motor. Those of ordinary skill in the art will understand that the target d-axis current component ($I_d^*$) can be adjusted in any suitable manner without deviating from the scope of the present disclosure.

In some embodiments, the control scheme 1000 can include a sensored feedback system (not shown) configured to obtain the one or more feedback measurements. For instance, in some embodiments, the control scheme 1000 can include a sensor (e.g., encoder, Hall effect sensor, etc.) configured to obtain a velocity signal and a phase-locked loop (PLL) configured to extract the frequency and phase from the velocity signal.

In other embodiments, the control scheme 1000 can include a sensorless feedback system (not shown) configured to obtain the one or more feedback measurements. As used herein, a "sensorless" feedback system can refer to any feedback system operable to determine data indicative of a position or a speed of the motor without a position sensor or a speed sensor. For instance, in some embodiments, the control scheme 1000 can include, e.g., an observer (not shown) configured to estimate back-EMF and/or velocity based, at least in part, on voltage and/or current signals of the motor. The back-EMF signal and/or the velocity signal can then be fed into a PLL (as described above) to extract the frequency and phase of the corresponding signal.

As mentioned above, the stroke controller 1004 (e.g., clearance controller 1004) may be configured to control the q-axis current component of the motor current. More particularly, the stroke controller 1004 can be configured to determine a target q-axis current component ($I_q^*$). For instance, the stroke controller 1004 can be configured to adjust the target q-axis current component ($I_q^*$) based, at least in part, on the one or more feedback measurements (e.g., current feedback).

As mentioned above, the capacity controller 1006 (e.g., extension controller 1006) may be configured to control the DC current component of the motor current. More particularly, the capacity controller 1006 can be configured to control a target DC current component ($I_0^*$). For instance, the capacity controller 1006 can be configured to adjust the target DC current component ($I_0^*$) based, at least in part, on the one or more feedback measurements (e.g., current feedback).

The target d-axis current component ($I_d^*$), target q-axis current component ($I_q^*$), and target DC current component ($I_0^*$) can then be passed to the single-phase vector-like controller 1008. As noted above, the single-phase vector-like controller 1008 can be configured to determine the requisite voltage (V) required by the inverter 1010 in order to drive the motor based, at least in part, on the target d-axis current component ($I_d^*$), the target q-axis current component ($I_q^*$), and the target DC current component ($I_0^*$).

Referring to FIG. 11, in embodiments, the controller can be configured to implement single-phase DQ0 control. In such embodiments, the single-phase vector-like controller 1008 can be configured to determine an actual d-axis current component ($I_d$), an actual q-axis current component ($I_q$), and an actual DC current component ($I_0$) based, at least in part, on the current feedback measurements (I). The control scheme 1000 can then use the actual d-axis current component ($I_d$), the actual q-axis current component ($I_q$), and the actual DC current component ($I_0$) to determine the total voltage (V) for the motor.

The controller (e.g., via control scheme 1000) can be configured to set the target d-axis current component ($I_d^*$) to zero. Further, the controller (e.g., via control scheme 1000) can be configured to adjust the target q-axis current component ($I_q^*$) based, at least in part, on the one or more feedback measurements. Furthermore, the controller (e.g., via control scheme 1000) can be configured to adjust the target DC current component ($I_0^*$).

The control scheme 1000 can be configured to obtain current feedback measurements (I) and piston displacement feedback measurements. For example, the control scheme 1000 can include a second-order generalized integrator 1150 (SOGI 1150) and a Park transform 1152 which, when used in tandem, can be configured to determine the actual d-axis current component ($I_d$), the actual q-axis current component ($I_q$), and the actual DC current component ($I_0$) of the current feedback measurements (I). In order to determine the actual d-axis current component ($I_d$), the actual q-axis current component ($I_q$), and the actual DC current component ($I_0$) of the current feedback measurements, the SOGI 1150 uses the frequency component ($\omega$) of the piston displacement feedback measurements, and the Park Transform 1152 uses the phase component ($\theta$) of the piston displacement feedback measurements.

The controller (e.g., via control scheme 1000) can be configured to determine a d-axis current error signal ($e_{id}$) between the target d-axis current component ($I_d^*$) and the actual d-axis current component ($I_d$) of the current feedback measurements (I). For instance, referring still to FIG. 11, the control scheme 1000 can be configured to determine the current error signal ($e_{id}$) (e.g., via a subtractor 1154) between the target d-axis current ($I_d^*$) and the actual d-axis current component ($I_d$) of the current feedback measurements (I).

The controller (e.g., via control scheme 1000) can be configured to determine a q-axis current error signal ($e_{iq}$) between the target q-axis current ($I_q^*$) and the actual q-axis current component ($I_q$) of the current feedback measurements (I). For instance, the control scheme 1000 can be configured to determine the q-axis current error signal ($e_{iq}$) (e.g., via a subtractor 1156) between the q-axis current setpoint ($I_q^*$) and the actual q-axis current component ($I_q$) of the current feedback measurements (I).

The controller (e.g., via control scheme 1000) can be configured to determine a DC current error signal ($e_{i0}$) between the target DC current ($I_0^*$) and the actual DC current component ($I_0$) of the current feedback measurements (I). For instance, the control scheme 1000 can be configured to determine the DC current error signal ($e_{i0}$) (e.g., via a subtractor 1158) between the DC current setpoint ($I_0^*$) and the actual DC current component ($I_0$) of the current feedback measurements (I).

Referring still to FIG. 11, the controller (e.g., via control scheme 1000) may be configured to decouple the q-axis and d-axis current error signals ($e_{iq}$), ($e_{id}$) from the q-axis and d-axis voltage component signals ($V_q$), ($V_d$). As such, the controller may be configured to determine the DQ0 voltage component signals ($V_o$), ($V_d$), ($V_q$) sequentially. More specifically, the controller can determine the DC voltage component ($V_o$) prior to the d-axis voltage component signal ($V_d$). Further, the controller can determine the d-axis voltage component signal ($V_d$) prior to the q-axis voltage component signal ($V_q$). That is, the controller may be configured to execute the DC voltage calculation module 1200 and then execute the d-axis voltage calculation module 1300 prior to executing the q-axis voltage calculation module 1400.

For instance, in one example implementation in accordance with one or more embodiments of the present disclosure, the design of the voltage calculation modules 1200, 300, 1400 may be based on the following functional relationship(s):

$$\begin{bmatrix} V_d^* \\ V_q^* \\ V_0^* \end{bmatrix} = \begin{bmatrix} k_{pd} + \frac{k_{idd}}{s} & -\frac{k_{idq}}{s} & 0 \\ \frac{k_{iqd}}{s} & k_{pq} + \frac{k_{iqq}}{s} & 0 \\ 0 & 0 & k_{p0} + \frac{k_{i0}}{s} \end{bmatrix} \begin{bmatrix} e_{id} \\ e_{iq} \\ e_{i0} \end{bmatrix}$$

where $k_{pd}$ is a first proportional gain, $k_{pq}$ is a second proportional gain, $k_{p0}$ is a third proportional gain, and $k_{idd}$, $k_{idq}$, $k_{iqq}$, $k_{iqd}$, and $k_{i0}$ are integral gains.

As can be seen, the d-axis voltage component signal ($V_d$) and the q-axis voltage component signal ($V_q$) are dependent on (i.e., cross-coupled with) the q-axis and d-axis current error signals ($e_{iq}$), ($e_{id}$). Furthermore, the cross-coupled integral gains $k_{idq}$, $k_{iqd}$ are frequency dependent such that the amount of cross-coupling increases as the frequency of the motor increases. More particularly, the cross-coupled integral gains $k_{idq}$, $k_{iqd}$ are related to the pole frequency, represented by $\omega_p$, of the motor. In particular the pole frequency is determined by the equation: $\omega_p = R/L$. During typical operation of a linear compressor, the frequency of the motor is much greater than the pole frequency, such that the cross-coupled integral gains $k_{idq}$, $k_{iqd}$ will dominate the AC voltages. Hence, the functional relationship(s) can be simplified to remove the diagonal integral terms $k_{idd}$, $k_{iqq}$ as follows:

$$\begin{bmatrix} V_d^* \\ V_q^* \\ V_0^* \end{bmatrix} = \begin{bmatrix} 0 & -\frac{k_{idq}}{s} & 0 \\ \frac{k_{idq}}{s} & 0 & 0 \\ 0 & 0 & k_{p0} + \frac{k_{i0}}{s} \end{bmatrix} \begin{bmatrix} e_{id} \\ e_{iq} \\ e_{i0} \end{bmatrix}$$

The controller (e.g., via control scheme 1000) can be configured to adjust the DC voltage component ($V_0$) based, at least in part, on the DC current error signal ($e_{i0}$). For instance, the control scheme 1000 can include the DC voltage calculation module 1200. The DC voltage calculation module 1200 can be configured to determine the DC voltage component ($V_0$) based, at least in part, on the DC current error signal ($e_{i0}$), as will be described in further detail below with regards to FIG. 12A.

The controller (e.g., via control scheme 1000) can be configured to then adjust the d-axis voltage component ($V_d$) based on the d-axis current error signal ($e_{id}$) and the q-axis current error signal ($e_{iq}$). For instance, the control scheme 1000 can include the d-axis voltage calculation module 1300. The d-axis voltage calculation module 1300 can be configured to determine the d-axis voltage component ($V_d$) based on the d-axis current error signal ($e_{id}$) and the q-axis current error signal ($e_{iq}$), as will be described in further detail below with regards to FIG. 12B. More particularly, the controller can be configured to adjust the d-axis voltage component ($V_d$) after adjusting the DC voltage component ($V_0$).

The controller (e.g., via control scheme 1000) can be configured to then adjust the q-axis voltage component ($V_q$) based on the d-axis current error signal ($e_{id}$) and the q-axis current error signal ($e_{iq}$). For instance, the control scheme 1000 can include the q-axis voltage calculation module 1400. The q-axis voltage calculation module 1400 can be configured to determine the q-axis voltage component ($V_q$) based on the d-axis current error signal ($e_{id}$) and the q-axis current error signal ($e_{iq}$), as will be described in further detail below with regards to FIG. 12C. More particularly, the controller can be configured to adjust the q-axis voltage component ($V_q$) after adjusting the d-axis voltage component ($V_d$).

Furthermore, referring to FIG. 11, the d-axis voltage component ($V_d$) can be combined with the phase of the piston displacement ($\theta$) at 1166, and the q-axis voltage component ($V_q$) can be combined with the phase of the piston displacement ($\theta$) at 1168. The voltage values determined at 1166 and 1168 can then be summed, at 1170, with the DC voltage component ($V_0$) to calculate the total voltage (V) necessary to drive the motor. The total voltage (V) can then be sent to the inverter 1010. Accordingly, the total voltage (V) is given by:

$$V = V_d \sin\theta + V_q \cos\theta + V_0$$

Referring now to FIG. 12A, the DC voltage calculation module 1200 receives the DC current error signal ($e_{i0}$). The DC voltage calculation module 1200 may be configured to determine the DC voltage component signal ($V_0$) based on the DC current error signal ($e_{i0}$). More specifically, the DC voltage calculation module 1200 may be configured to determine the DC voltage component signal ($V_0$) by combining (e.g., via a summator 1202) a first signal 1204 and a second signal 1206 to obtain a first output 1207.

The DC voltage calculation module 1200 may be further configured to constrain the first output 1207 via a saturator 1209 to obtain the DC voltage component signal ($V_0$). The DC voltage component signal ($V_0$) can be constrained by an upper limit 1208 and a lower limit 1210. In some embodiments, the DC voltage calculation module 1200 may be configured to determine the upper limit 1208 and the lower limit 1210. The upper limit 1208 and the lower limit 1210 may be determined based, at least in part, on a first voltage threshold. The first voltage threshold may be a fixed voltage. In some embodiments, as shown in FIG. 12A, the first voltage threshold may be a maximum peak voltage ($V_{max}$) of the motor drive (e.g., inverter 1010). In some instances, the maximum peak voltage ($V_{max}$) can be based, at least in part, on a DC bus voltage of the inverter 1010. In such embodiments, the maximum peak voltage ($V_{max}$) can be the upper limit 1208. Additionally, a negated maximum peak voltage ($-V_{max}$) (e.g., obtained by applying (e.g., via multiplication) a gain with a value of negative one ($-1$) to the maximum peak voltage ($V_{max}$)) can be the lower limit 1210. In other embodiments, the first voltage threshold may be less than the maximum peak voltage ($V_{max}$). In such embodiments, the first voltage threshold may be a voltage beyond which the DC voltage component signal ($V_0$) should be limited so as to prevent excessive loading of electrical components in response to control instability. Accordingly, the DC voltage component signal ($V_0$) can be configured to achieve the DC target current component signal ($I_0^*$).

The DC voltage calculation module 1200 may be configured to determine the first signal 1204 based on the DC current error signal ($e_{i0}$). For example, the DC voltage calculation module 1200 may be configured to apply the third proportional gain $k_{p0}$ (e.g., via multiplication) to the DC current error signal ($e_{i0}$) to obtain the first signal 1204.

Additionally, the DC voltage calculation module 1200 may be configured to determine the second signal 1206 based on the DC current error signal ($e_{i0}$). For example, the DC voltage calculation module 1200 may be configured to apply the integral gain $k_{i0}$ (e.g., via multiplication) to the DC current error signal ($e_{i0}$) to obtain an output 1203. The DC voltage calculation module 1200 may then integrate the output 1203 via an integrator 1205 to obtain the second signal 1206.

The second signal 1206 may be constrained by an upper limit 1222 and a lower limit 1224. In some embodiments, the DC voltage calculation module 1200 may be configured to determine the upper limit 1222 and the lower limit 1224. The upper limit 1222 and the lower limit 1224 may be determined based, at least in part, on the maximum peak voltage ($V_{max}$). For example, as shown, the maximum peak voltage ($V_{max}$) can be compared (e.g., at a subtractor 1230) to the first signal 1204 to determine the upper limit 1222. Additionally, the negated maximum peak voltage ($-V_{max}$) can be compared (e.g., at the subtractor 1230) to the first signal 1204 to determine the lower limit 1224. Using the maximum peak voltage ($V_{max}$) to determine the upper and lower limits 1222, 1224 can reduce wind up of the integrator 1205.

As shown in FIG. 12B, the d-axis voltage calculation module 1300 receives the q-axis and d-axis current error signals ($e_{iq}$), ($e_{id}$). The d-axis voltage calculation module 1300 may be configured to determine the d-axis voltage component signal ($V_d$) based on the q-axis and d-axis current error signals ($e_{iq}$), ($e_{id}$). More specifically, the d-axis voltage calculation module 1300 may be configured to determine the d-axis voltage component signal ($V_d$) by combining (e.g., via a summator 1302) a third signal 1304 and a fourth signal 1306 to obtain a second output 1307.

The d-axis voltage calculation module 1300 may be further configured to constrain the second output 1307 via a saturator 1309 to obtain the d-axis voltage component signal ($V_d$). The d-axis voltage component signal ($V_d$) can be constrained by an upper limit 1308 and a lower limit 1310. In some embodiments, the d-axis voltage calculation module 1300 may be configured to determine the upper limit 1308 and the lower limit 1310. The upper limit 1308 and the lower limit 1310 may be determined based, at least in part, on a second voltage threshold. The second voltage threshold is different than the first voltage threshold. For instance, when the first voltage threshold is the maximum peak voltage ($V_{max}$), the second voltage threshold is less than the first voltage threshold. As another example, when the first voltage threshold is less than the maximum peak voltage ($V_{max}$), the second voltage threshold may be greater than the first voltage threshold.

The second voltage threshold may be referred to herein as an ac voltage ($V_{ac}$). The ac voltage ($V_{ac}$) may, for example, be a variable voltage dependent on the maximum peak voltage ($V_{max}$) and the DC voltage component signal ($V_0$). For example, the d-axis voltage calculation module 1300 can be configured to determine the ac voltage ($V_{ac}$) based on the following relationship:

$$V_{ac} = V_{max} - |V_0|$$

As shown, the ac voltage ($V_{ac}$) can be the upper limit 1308. Additionally, a negated ac voltage ($-V_{ac}$) (e.g., obtained by applying (e.g., via multiplication) a gain with a value of negative one (−1) to the ac voltage ($V_{ac}$)) can be the lower limit 1310. Accordingly, the d-axis voltage component signal ($V_d$) can be configured to achieve the q-axis target current component signal ($I_q^*$).

The d-axis voltage calculation module 1300 may be configured to determine the third signal 1304 based on the d-axis current error signal ($e_{id}$). For example, the d-axis voltage calculation module 1300 may be configured to apply the first proportional gain $k_{pd}$ (e.g., via multiplication) to the d-axis current error signal ($e_{id}$) to obtain the third signal 1304.

Further, the d-axis voltage calculation module 1300 may be configured to determine the fourth signal 1306 based on the q-axis current error signal ($e_{iq}$). For example, the d-axis voltage calculation module 1300 can apply the integral gain $k_{idq}$ (e.g., via multiplication) to q-axis current error signal ($e_{iq}$) to obtain an output 1312. The d-axis voltage calculation module 1300 may be further configured to integrate the output 1312 via an integrator 1314 to obtain the fourth signal 1306.

The fourth signal 1306 may be constrained by an upper limit 1322 and a lower limit 1324. In some embodiments, the d-axis voltage calculation module 1300 may be configured to determine the upper limit 1322 and the lower limit 1324.

The upper limit 1322 and the lower limit 1324 may be determined based, at least in part, on the ac voltage ($V_{ac}$). For example, as shown, ac voltage ($V_{ac}$) can be compared (e.g., at a subtractor 1330) to the third signal 1304 to determine the upper limit 1322. Additionally, the negated ac voltage ($-V_{ac}$) can be compared (e.g., at the subtractor 1330) to the third signal 1304 to determine the lower limit 1324. Using the ac voltage ($V_{ac}$) to determine the upper and lower limits 1322, 1324 can prevent wind up of the integrator 1314.

Referring now to FIG. 12C, the q-axis voltage calculation module 1400 receives the q-axis and d-axis current error signals ($e_{iq}$), ($e_{id}$). The q-axis voltage calculation module 1400 may be configured to determine the q-axis voltage component signal ($V_q$) based on the q-axis and d-axis current error signals ($e_{iq}$), ($e_{id}$). More specifically, the q-axis voltage calculation module 1400 may be configured to determine the q-axis voltage component signal ($V_q$) by combining (e.g., via a summator 1402) a fifth signal 1404 and a sixth signal 1406 to obtain a third output 1407.

The q-axis voltage calculation module 1400 may be further configured to constrain the third output 1407 via a saturator 1409 to obtain the q-axis voltage component signal ($V_q$). The q-axis voltage component signal ($V_q$) can be constrained by an upper limit 1408 and a lower limit 1410. In some embodiments, the q-axis voltage calculation module 1400 may be configured to determine the upper limit 1408 and the lower limit 1410. The upper limit 1408 and the lower limit 1410 may be determined based, at least in part, on a third voltage threshold. The third voltage threshold may be referred to herein as a remaining voltage ($V_r$). The remaining voltage ($V_r$) may, for example, be a variable voltage dependent on the maximum peak voltage ($V_{max}$), the DC voltage component signal ($V_0$), and the d-axis voltage component signal ($V_d$). For example, the q-axis voltage calculation module 1400 can be configured to determine the remaining voltage ($V_r$) based on the following relationship:

$$V_r = \sqrt{((V_{max} - |V_0|)^2 - V_d^2)}$$

As shown, the remaining voltage ($V_r$) can be the upper limit 1408. Additionally, a negated remaining voltage ($-V_r$) (e.g., obtained by applying (e.g., via multiplication) a gain with a value of negative one (−1) to the remaining voltage ($V_r$)) can be the lower limit 1410.

The q-axis voltage calculation module 1400 may be configured to determine the fifth signal 1404 based on the q-axis current error signal ($e_{iq}$). For example, the q-axis voltage calculation module 1400 may be configured to apply the second proportional gain $k_{pq}$ (e.g., via multiplication) to the q-axis current error signal ($e_{iq}$) to obtain the fifth signal 1404.

Further, the q-axis voltage calculation module 1400 may be configured to determine the sixth signal 1406 based on the d-axis current error signal ($e_{id}$). For example, the q-axis voltage calculation module 1400 can apply the integral gain $k_{iqd}$ (e.g., via multiplication) to the d-axis current error signal ($e_{id}$) to obtain an output 1414. The q-axis voltage calculation module 1400 may be further configured to integrate the output 1414 via an integrator 1416 to obtain the sixth signal 1406.

The sixth signal 1406 may be constrained by an upper limit 1418 and a lower limit 1420. In some embodiments, the q-axis voltage calculation module 1400 may be configured to determine the upper limit 1418 and the lower limit 1420. The upper limit 1418 and the lower limit 1420 may be determined based, at least in part, on the remaining voltage ($V_r$). For example, as shown, the remaining voltage ($V_r$) can be compared (e.g., at a subtractor 1430) to the fifth signal 1404 to determine the upper limit 1418. Additionally, the negated remaining voltage ($-V_r$) can be compared (e.g., at the subtractor 1430) to the fifth signal 1404 to determine the lower limit 1420. Using the remaining voltage ($V_r$) to determine the upper and lower limits 1418, 1420 can prevent wind up of the integrator 1416.

The q-axis voltage component signal ($V_q$) can be configured to introduce a negative d-axis current ($I_d$). More specifically, because the q-axis voltage component signal ($V_q$) is limited by the remaining phase voltage ($V_r$), the q-axis voltage component signal ($V_q$) may be unable to achieve the d-axis target current component signal ($I_d^*$) when the frequency of the motor is above the pole frequency. As such, a negative d-axis current ($I_d$) may result from the q-axis voltage component signal ($V_q$). The negative d-axis current ($I_d$) may be minimized and dynamically adjusted as a result of the remaining phase voltage ($V_r$) limiting the q-axis voltage component signal ($V_q$) and being dependent on the d-axis voltage component signal ($V_d$) and the DC voltage component signal ($V_0$).

The negative d-axis current ($I_d$) may implement a flux weakening operation that offsets the back-EMF of the motor. As such, the negative d-axis current ($I_d$) can reduce the total voltage required to operate the motor, while at the same time, increasing the stroke of the motor. Minimizing and dynamically adjusting the negative d-axis current ($I_d$) increases the efficiency of the motor by preventing excessive current from being applied to implement the flux weakening operation. Further, determining the q-axis voltage component signal ($v_q$) after the d-axis voltage component signal ($v_d$) and the DC voltage component signal ($v_0$) maximizes utilization of DC bus voltage so as to achieve a required stroke length without running out of clearance.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for controlling a linear compressor of an appliance, the method comprising:
   receiving, via a controller of the linear compressor, a d-axis current error signal, a q-axis current error signal, and a DC current error signal;
   determining, via the controller, a DC voltage component signal based on the DC current error signal, the DC voltage component signal being limited by a first voltage threshold;
   then determining, via the controller, a d-axis voltage component signal based, at least in part, on the q-axis current error signal, the d-axis voltage component signal being limited by a second voltage threshold that is different than the first voltage threshold;
   then determining, via the controller, a q-axis voltage component signal based, at least in part, on the d-axis current error signal, the q-axis voltage component signal being limited by a third voltage threshold that is less than the second voltage threshold; and
   controlling, via the controller, a motor of the linear compressor using a single-phase vector-like control scheme based, at least in part, on the DC voltage component signal, the d-axis voltage component signal and the q-axis voltage component signal.

2. The method of claim 1, wherein:
   the first voltage threshold is less than or equal to a maximum peak voltage of a motor drive;
   the second voltage threshold is a variable voltage dependent on at least the DC voltage component signal and the maximum peak voltage of a motor drive; and
   the third voltage threshold is a variable voltage dependent on the d-axis voltage component signal and the second voltage threshold.

3. The method of claim 1, wherein determining, via the controller, the DC voltage component signal based on the DC current error signal further comprises:
   applying a first proportional gain to the DC current error signal to obtain a first signal;
   applying a first integral gain to the DC current error signal to obtain an output;
   integrating the output to obtain a second signal; and
   combining the first signal and the second signal to determine the DC voltage component signal.

4. The method of claim 3, wherein the second signal is limited based on the first voltage threshold and the first signal.

5. The method of claim 1, wherein then determining, via the controller, the q-axis voltage component signal based, at least in part, on the d-axis current error signal further comprises:
   applying a second proportional gain to the q-axis current error signal to obtain a third signal;
   applying a second integral gain to the d-axis current error signal to obtain a second output;
   integrating the second output to obtain a fourth signal; and
   combining the third signal and the fourth signal to determine the q-axis voltage component signal.

6. The method of claim 5, wherein the fourth signal is limited based on the second voltage threshold and the third signal.

7. The method of claim 1, wherein then determining, via the controller, the d-axis voltage component signal based, at least in part, on the q-axis current error signal further comprises:
   applying a third proportional gain to the d-axis current error signal to obtain a fifth signal;
   applying a third integral gain to the q-axis current error signal to obtain a third output;
   integrating the third output to obtain a sixth signal; and
   combining the fifth signal and the sixth signal to determine the d-axis voltage component signal.

8. The method of claim 7, wherein the sixth signal is limited based on the third voltage threshold and the fifth signal.

9. A linear compressor defining an axial direction and a vertical direction, the linear compressor for an appliance comprising:
   a cylindrical casing defining a compressor chamber;
   a piston positioned within the compressor chamber and being movable along the axial direction;
   a motor operably coupled to the piston; and
   a controller configured to control the motor, the controller configured to perform operations for controlling the motor, the operations comprising:
   receiving a d-axis current error signal, a q-axis current error signal, and a DC current error signal;

determining a DC voltage component signal based on the DC current error signal, the DC voltage component signal being limited by a first voltage threshold;

then determining a d-axis voltage component signal based, at least in part, on the q-axis current error signal, the d-axis voltage component signal being limited by a second voltage threshold that is different than the first voltage threshold;

then determining a q-axis voltage component signal based, at least in part, on the d-axis current error signal, the q-axis voltage component signal being limited by a third voltage threshold that is less than the second voltage threshold; and controlling a motor of the linear compressor using a single-phase vector-like control scheme based, at least in part, on the DC voltage component signal, the d-axis voltage component signal and the q-axis voltage component signal.

10. The linear compressor of claim 9, wherein:
the first voltage threshold is less than or equal to a maximum peak voltage of a motor drive;
the second voltage threshold is a variable voltage dependent on at least the DC voltage component signal and the maximum peak voltage of a motor drive; and
the third voltage threshold is a variable voltage dependent on the d-axis voltage component signal and the second voltage threshold.

11. The linear compressor of claim 9, wherein determining the DC voltage component signal based on the DC current error signal further comprises:
applying a first proportional gain to the DC current error signal to obtain a first signal;
applying a first integral gain to the DC current error signal to obtain an output;
integrating the output to obtain a second signal; and
combining the first signal and the second signal to determine the DC voltage component signal.

12. The linear compressor of claim 9, wherein then determining the q-axis voltage component signal based, at least in part, on the d-axis current error signal further comprises:
applying a second proportional gain to the q-axis current error signal to obtain a third signal;
applying a second integral gain to the d-axis current error signal to obtain a second output;
integrating the second output to obtain a fourth signal; and
combining the third signal and the fourth signal to determine the q-axis voltage component signal.

13. The linear compressor of claim 9, wherein then determining the d-axis voltage component signal based, at least in part, on the q-axis current error signal further comprises:
applying a third proportional gain to the d-axis current error signal to obtain a fifth signal;
applying a third integral gain to the q-axis current error signal to obtain a third output;
integrating the third output to obtain a sixth signal; and
combining the fifth signal and the sixth signal to determine the d-axis voltage component signal.

14. The linear compressor of claim 9, wherein:
the piston is a reciprocating piston; and
the motor is a single-phase linear motor.

15. An appliance, comprising:
a cabinet defining an internal chamber;
a door mounted to the cabinet to provide selective access to the internal chamber;
a linear compressor, the linear compressor having a piston movable in a negative axial direction toward a compressor chamber and a positive axial direction away from the compressor chamber;
a motor operably coupled to the piston;
an inverter configured to supply a variable frequency waveform to the motor; and
a controller configured to control the motor, the controller configured to perform operations for controlling the motor, the operations comprising:
receiving a d-axis current error signal, a q-axis current error signal, and a DC current error signal;
determining a DC voltage component signal based on the DC current error signal, the DC voltage component signal being limited by a first voltage threshold;
then determining a d-axis voltage component signal based, at least in part, on the q-axis current error signal, the d-axis voltage component signal being limited by a second voltage threshold that is different than the first voltage threshold;
then determining a q-axis voltage component signal based, at least in part, on the d-axis current error signal, the q-axis voltage component signal being limited by a third voltage threshold that is less than the second voltage threshold; and
controlling a motor of the linear compressor using a single-phase vector-like control scheme based, at least in part, on the DC voltage component signal, the d-axis voltage component signal and the q-axis voltage component signal.

16. The appliance of claim 15, wherein:
the first voltage threshold is less than or equal to a maximum peak voltage of a motor drive;
the second voltage threshold is a variable voltage dependent on at least the DC voltage component signal and the maximum peak voltage of a motor drive; and
the third voltage threshold is a variable voltage dependent on the d-axis voltage component signal and the second voltage threshold.

17. The appliance of claim 15, wherein determining the DC voltage component signal based on the DC current error signal further comprises:
applying a first proportional gain to the DC current error signal to obtain a first signal;
applying a first integral gain to the DC current error signal to obtain an output;
integrating the output to obtain a second signal; and
combining the first signal and the second signal to determine the DC voltage component signal.

18. The appliance of claim 15, wherein then determining the q-axis voltage component signal based, at least in part, on the d-axis current error signal further comprises:
applying a second proportional gain to the q-axis current error signal to obtain a third signal;
applying a second integral gain to the d-axis current error signal to obtain a second output;
integrating the second output to obtain a fourth signal; and
combining the third signal and the fourth signal to determine the q-axis voltage component signal.

19. The appliance of claim 15, wherein then determining the d-axis voltage component signal based, at least in part, on the q-axis current error signal further comprises:
applying a third proportional gain to the d-axis current error signal to obtain a fifth signal;
applying a third integral gain to the q-axis current error signal to obtain a third output;

integrating the third output to obtain a sixth signal; and
combining the fifth signal and the sixth signal to determine the d-axis voltage component signal.

20. The appliance of claim 15, wherein:
the piston is a reciprocating piston; and
the motor is a single-phase linear motor.

* * * * *